US011272113B2

(12) United States Patent
Kanai et al.

(10) Patent No.: US 11,272,113 B2
(45) Date of Patent: Mar. 8, 2022

(54) CONTROL APPARATUS AND CONTROL METHOD FOR EXPOSURE ADJUSTMENT

(71) Applicant: SONY CORPORATION, Tokyo (JP)

(72) Inventors: Toshinori Kanai, Saitama (JP); Shohei Sakaguchi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/756,202

(22) PCT Filed: Sep. 12, 2018

(86) PCT No.: PCT/JP2018/033802
§ 371 (c)(1),
(2) Date: Apr. 15, 2020

(87) PCT Pub. No.: WO2019/082539
PCT Pub. Date: May 2, 2019

(65) Prior Publication Data
US 2021/0195083 A1 Jun. 24, 2021

(30) Foreign Application Priority Data
Oct. 24, 2017 (JP) .............................. JP2017-205183

(51) Int. Cl.
*H04N 5/235* (2006.01)
*G03B 7/091* (2021.01)
(Continued)

(52) U.S. Cl.
CPC ......... *H04N 5/2352* (2013.01); *H04N 5/2351* (2013.01)

(58) Field of Classification Search
CPC .... H04N 5/235; H04N 5/2351; H04N 5/2352; H04N 5/2353; H04N 5/2354; H04N 5/243; H04N 5/238
(Continued)

(56) References Cited

U.S. PATENT DOCUMENTS

2004/0101296 A1  5/2004  Nakata et al.
2005/0074232 A1  4/2005  Nakata et al.
(Continued)

FOREIGN PATENT DOCUMENTS

CN    1499823 A    5/2004
CN    103813097 A   5/2014
(Continued)

OTHER PUBLICATIONS

International Search Report and Written Opinion of PCT Application No. PCT/JP2018/033802, dated Oct. 30, 2018, 10 pages of ISRWO.

*Primary Examiner* — Albert H Cutler
(74) *Attorney, Agent, or Firm* — Chip Law Group

(57) ABSTRACT

A region extracting section 31 extracts an image of a subject region and an image of a background region from a picked up image. A region-specific exposure control amount calculating section 33 calculates a subject region exposure control amount based on the image of the subject region and a background region exposure control amount based on the image of the background region. An exposure control amount calculating section 34 sets a contribution ratio of the subject region exposure control amount and a contribution ratio of the background region exposure control amount, and calculates an exposure control amount for use in exposure adjustment by mixing the subject region exposure control amount and the background region exposure control amount at a mixing ratio based on the set contribution ratios. A control section 55 controls a shutter speed, an aperture value, and other settings based on the exposure control amount calculated by the exposure control amount calculating section 34. Thus, regardless of whether or not flash light emission is to be performed, stable exposure is obtained with natural, balanced brightness ensured in the picked up image.

14 Claims, 18 Drawing Sheets

(51) Int. Cl.
*G03B 15/00* (2021.01)
*H04N 5/225* (2006.01)
*H04N 5/238* (2006.01)

(58) Field of Classification Search
USPC .................................. 348/362, 363, 364, 366
See application file for complete search history.

(56) References Cited

U.S. PATENT DOCUMENTS

| | | | |
|---|---|---|---|
| 2005/0232623 A1 | 10/2005 | Nonaka | |
| 2009/0028394 A1 | 1/2009 | Hosoi et al. | |
| 2014/0125863 A1* | 5/2014 | Toyoda | H04N 5/2355 |
| | | | 348/362 |
| 2020/0118257 A1* | 4/2020 | Zeng | H04N 5/2355 |

FOREIGN PATENT DOCUMENTS

| | | |
|---|---|---|
| JP | 09-037143 A | 2/1997 |
| JP | 2004-173251 A | 6/2004 |
| JP | 2008-306765 A | 12/2008 |
| JP | 2009-033238 A | 2/2009 |
| JP | 2013-013041 A | 1/2013 |
| JP | 2014-096621 A | 5/2014 |
| JP | 2016-192605 A | 11/2016 |

\* cited by examiner

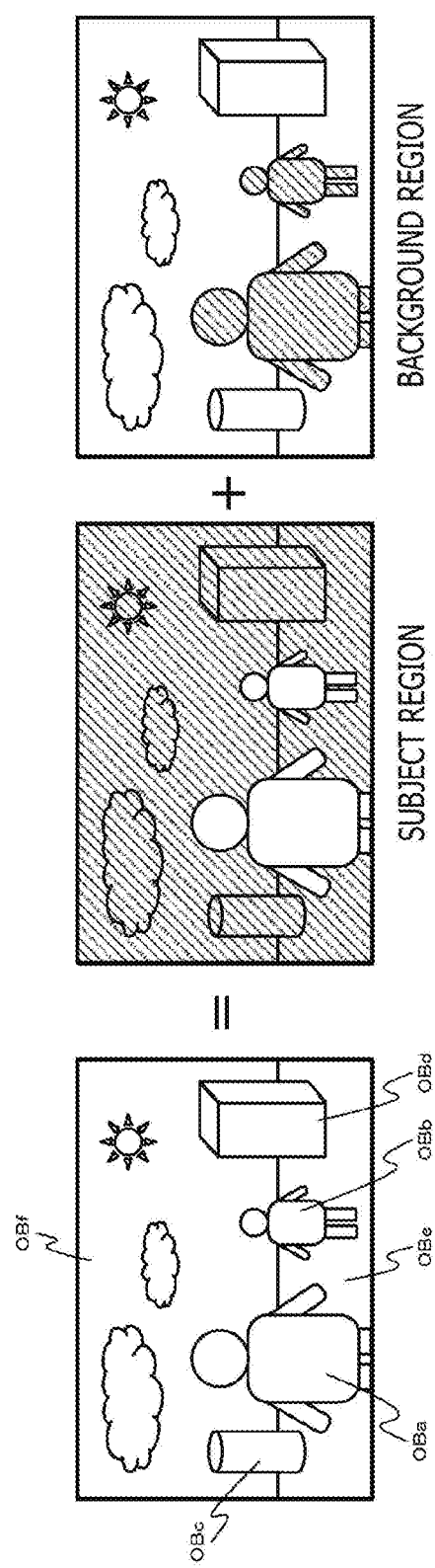

FIG. 6

| COMPARISON BETWEEN SUBJECT AND BACKGROUND IN BRIGHTNESS | FLASH UNIT | COMPARISON OF REGION EXPOSURE CONTROL AMOUNTS (+: BRIGHTER DIRECTION, −: DARKER DIRECTION) | | | REGION TO BE EMPHASIZED UPON SETTING OF CONTRIBUTION RATIO |
|---|---|---|---|---|---|
| | | CVm | MAGNITUDE RELATION | CVb | |
| SUBJECT < BACKGROUND | LIGHT NOT EMITTED | − | > | − | SUBJECT REGION |
| SUBJECT < BACKGROUND | LIGHT NOT EMITTED | − | < | + | SUBJECT REGION |
| SUBJECT < BACKGROUND | LIGHT NOT EMITTED | + | > | − | SUBJECT REGION |
| SUBJECT > BACKGROUND | LIGHT NOT EMITTED | + | > | + | SUBJECT REGION |
| SUBJECT > BACKGROUND | LIGHT NOT EMITTED | − | < | − | SUBJECT REGION |
| SUBJECT > BACKGROUND | LIGHT NOT EMITTED | + | < | + | SUBJECT REGION |
| SUBJECT < BACKGROUND | LIGHT EMITTED | − | > | − | BACKGROUND REGION |
| SUBJECT < BACKGROUND | LIGHT EMITTED | − | < | + | SUBJECT REGION |
| SUBJECT < BACKGROUND | LIGHT EMITTED | + | > | − | BACKGROUND REGION |
| SUBJECT > BACKGROUND | LIGHT EMITTED | + | > | + | BACKGROUND REGION |
| SUBJECT > BACKGROUND | LIGHT EMITTED | − | < | − | SUBJECT REGION |
| SUBJECT > BACKGROUND | LIGHT EMITTED | − | < | + | SUBJECT REGION |
| SUBJECT > BACKGROUND | LIGHT EMITTED | + | > | − | BACKGROUND REGION |
| SUBJECT > BACKGROUND | LIGHT EMITTED | + | < | + | SUBJECT REGION |

CONTROL APPARATUS AND CONTROL METHOD FOR EXPOSURE ADJUSTMENT

CROSS REFERENCE TO RELATED APPLICATIONS

This application is a U.S. National Phase of International Patent Application No. PCT/JP2018/033802 filed on Sep. 12, 2018, which claims priority benefit of Japanese Patent Application No. JP 2017-205183 filed in the Japan Patent Office on Oct. 24, 2017. Each of the above-referenced applications is hereby incorporated herein by reference in its entirety.

TECHNICAL FIELD

The present technology relates to a control apparatus, a control method, and a program for obtaining stable exposure.

BACKGROUND ART

In the past, imaging apparatuses have performed exposure control in such a manner as to acquire picked up images of appropriate brightness. For example, PTL 1 describes techniques by which the region of a subject and that of the background are separated from each other so as to find a difference in average luminance therebetween, the difference being used to calculate an overall exposure control amount. PTL 2 describes techniques by which, with the subject region extracted, photometric values of the subject region and of the background region are used to calculate contrast values for determining a final exposure control amount.

CITATION LIST

Patent Literature

[PTL 1]
Japanese Patent Laid-open No. 2013-013041
[PTL 2]
Japanese Patent Laid-open No. 1997-037143

SUMMARY

Technical Problem

When an exposure control amount is calculated from the difference in luminance between the subject region and the background region as described in the above-cited patent literature, exposure control is performed regardless of the camera settings or the environment at the time of imaging. For example, there is a possibility that a picked up image acquired by flash light emission may have an unintended finish due to the emitted light as an additional component.

Thus, the present technology aims to provide a control apparatus, a control method, and a program for obtaining stable exposure.

Solution to Problem

According to a first aspect of the present technology, there is provided a control apparatus including an exposure control amount calculating section configured to calculate an exposure control amount for use in exposure adjustment based on a subject region exposure control amount calculated on the basis of photometric values of a subject region and on a background region exposure control amount calculated on the basis of photometric values of a background region.

According to this technology, an image extracting section extracts an image of the subject region and an image of the background region from a picked up image. A region-specific exposure control amount calculating section calculates the subject region exposure control amount based on the image of the subject region and the background region exposure control amount based on the image of the background region. The exposure control amount calculating section determines a contribution ratio of the subject region exposure control amount and a contribution ratio of the background region exposure control amount. The exposure control amount calculating section further calculates final exposure control as the exposure control amount for use in exposure adjustment by mixing the subject region exposure control amount with the background region exposure control amount based on the contribution ratios.

The exposure control amount calculating section sets the contribution ratios based on the result of comparison between the subject region exposure control amount and the background region exposure control amount. For example, in a case where the subject region exposure control amount is larger than the background region exposure control amount, the contribution ratio of the background region exposure control amount is made higher than that of the subject region exposure control amount. In a case where flash light emission is not to be performed or in a case where the subject region exposure control amount is not larger than the background region exposure control amount, the contribution ratio of the subject region exposure control amount is made higher than that of the background region exposure control amount.

The exposure control amount calculating section compares a difference between the exposure control amount calculated on the basis of the set contribution ratios and the exposure control amount of the region with the lower contribution ratio with a predetermined threshold value, and adjusts the contribution ratios in such a manner that the difference between the exposure control amounts does not exceed the threshold value. Also, the contribution ratios are adjusted in a case where the subject region exposure control amount is larger than the background region exposure control amount.

The contribution ratios are adjusted on the basis of imaging-related information regarding acquisition of a picked up image, such as at least any one of imaging environment information, imaging setting information, image state information regarding the picked up image, or user setting information. The imaging environment information includes an external light illuminance or a distance to a subject. The imaging setting information includes any one of a shutter speed, an ISO speed, an aperture value, a flash light emission amount, or a flash reaching distance. The image state information includes any one of an area ratio between the subject region and the background region, a position of the subject region in the picked up image, or an amount of image blur of the background region. The contribution ratios are adjusted by giving preference to the user setting information over the other information in the imaging-related information.

Furthermore, in extracting the regions, in a case where the image of either the subject region or the background region cannot be extracted, the picked up image minus the image of the extracted region is obtained as the image of the non-extracted region. In a case where both the image of the subject region and the image of the background region cannot be extracted, a whole region exposure control amount is calculated on the basis of the picked up image, and the whole region exposure control amount thus calculated is obtained as the exposure control amount.

According to a second aspect of the present technology, there is provided a control method including calculating an exposure control amount for use in exposure adjustment based on a subject region exposure control amount calculated on the basis of photometric values of a subject region and on a background region exposure control amount calculated on the basis of photometric values of a background region.

According to a third aspect of the present technology, there is provided a program for causing a computer to calculate an exposure control amount for use in exposure adjustment, the program causing the computer to perform a procedure of calculating the exposure control amount for use in exposure adjustment based on a subject region exposure control amount calculated on the basis of photometric values of a subject region and on a background region exposure control amount calculated on the basis of photometric values of a background region.

Incidentally, the program of the present technology may be offered in a computer-readable format to a general-purpose computer capable of executing diverse program codes using storage media such as optical discs, magnetic discs or semiconductor memories, or via communication media such as networks. When provided with that program in a computer-readable manner, the computer performs the processes defined by the program.

Advantageous Effects of Invention

According to the present technology, the exposure control amount for use in exposure adjustment is calculated on the basis of the subject region exposure control amount calculated from the photometric values of the subject region and the background region exposure control amount calculated from the photometric values of the background region. Exposure adjustment is then performed in accordance with the exposure control amount thus calculated, which permits stable exposure. Incidentally, the advantageous effects stated in this description are only for illustrative purposes and are not limitative of the present technology. The present disclosure may further provide other advantageous effects.

BRIEF DESCRIPTION OF DRAWINGS

FIG. 4 is a view explaining a process of supplementing a region exposure control amount.

FIG. 6 is a tabular view listing regions that are emphasized at the time final contribution ratios are set.

DESCRIPTION OF EMBODIMENTS

Figure 1:
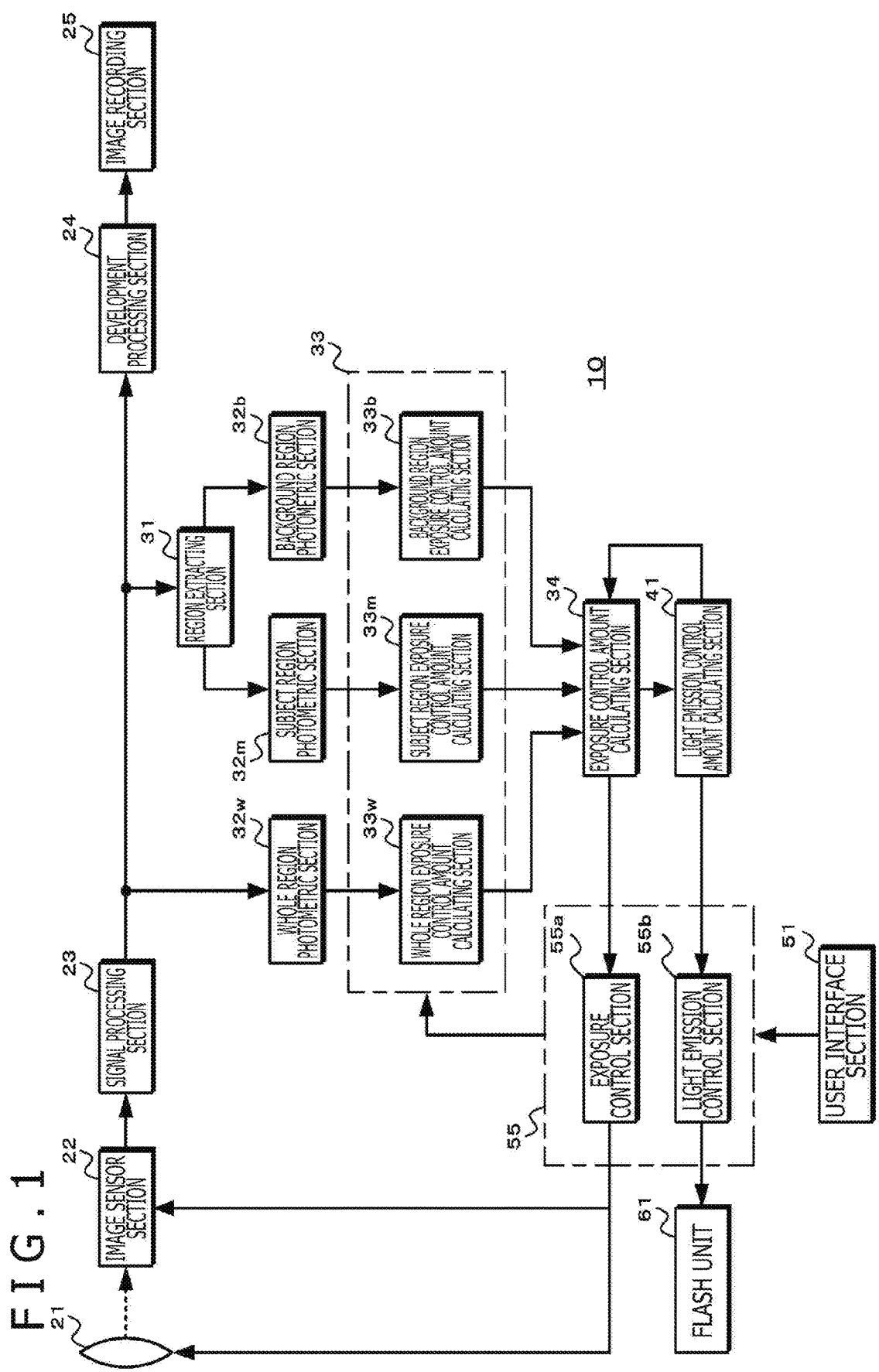
FIG. 1 is a view depicting an exemplary configuration of an imaging apparatus.

Preferred embodiments for implementing the present technology are described below. The description will be given under the following headings:
1. Configuration of the imaging apparatus
2. Operations of the imaging apparatus
2-1. First operation example
2-2. Second operation example
2-3. Other operation examples
3. Application examples
3-1. First application example
3-2. Second application example 1. Configuration of the Imaging Apparatus FIG. 1 depicts an exemplary configuration of an imaging apparatus that uses the present technology. An imaging apparatus 10 includes an imaging optical system block 21, an image sensor section 22, a signal processing section 23, a development processing section 24, and an image recording section 25. The imaging apparatus 10 further includes a region extracting section 31, a whole region photometric section 32w, a subject region photometric section 32m, a background region photometric section 32b, a region-specific exposure control amount calculating section 33, an exposure control amount calculating section 34, a user interface section 51, and a control section 55. The imaging apparatus 10 may also include a light emission control amount calculating section 41 and a flash unit 61.

The imaging optical system block 21 has a group of lenses including a focus lens and a zoom lens. The imaging optical system block 21 forms an optical image of a desired subject size on an imaging plane of the image sensor section 22. The imaging optical system block 21 may also include a diaphragm mechanism that adjusts the light intensity of the optical image.

The image sensor section 22 includes a CMOS (Complementary Metal Oxide Semiconductor) image sensor or a CCD (Charge Coupled Device) image sensor and a driving section that drives the image sensor. The image sensor section 22 performs photoelectric conversion to generate an imaging signal reflecting the optical image and outputs the generated imaging signal to the signal processing section 23.

The signal processing section 23 performs signal processing such as analog/digital conversion, noise removal, and defect correction on the imaging signal generated by the image sensor section 22. The signal processing section 23 outputs the processed imaging signal to the development processing section 24, to the region extracting section 31, and to the whole region photometric section 32w. The imaging signal having undergone the signal processing is also referred to as the RAW image data.

The development processing section 24 performs development processing on the image data supplied from the signal processing section 23. The development processing includes part or all of gamma correction, white balance adjustment, color space conversion, and optical distortion correction. In the case where the image sensor in the image sensor section 22 uses color mosaic filters, the development processing section 24 performs a demosaicing process to generate image data for each color component. The development processing section 24 outputs the imaging data having undergone the development process to the image recording section 25.

A recording medium is attached permanently or detachably to the image recording section 25. The image recording section 25 converts the image data output from the development processing section 24 into data in a predetermined format before recording the converted data to the recording medium. Further, the image recording section 25 records auxiliary information regarding the data in the predetermined format in association with the data in the predetermined format.

The region extracting section 31 extracts a subject region and a background region from a picked up image based on the image data supplied from the signal processing section 23 and on predetermined extraction conditions. The subject region is an image region indicative of the subject of interest (main subject) such as a person detected from the picked up image through subject recognition, for example. The background region is an image region indicative of the sky and clouds farther than a predetermined distance, for example. Alternatively, the background region may be an image region obtained by excluding the subject region from the picked up image, as will be discussed later. The region extracting section 31 outputs the image data of the subject region to the subject region photometric section 32m and the image data of the background region to the background region photometric section 32b.

Figure 2:
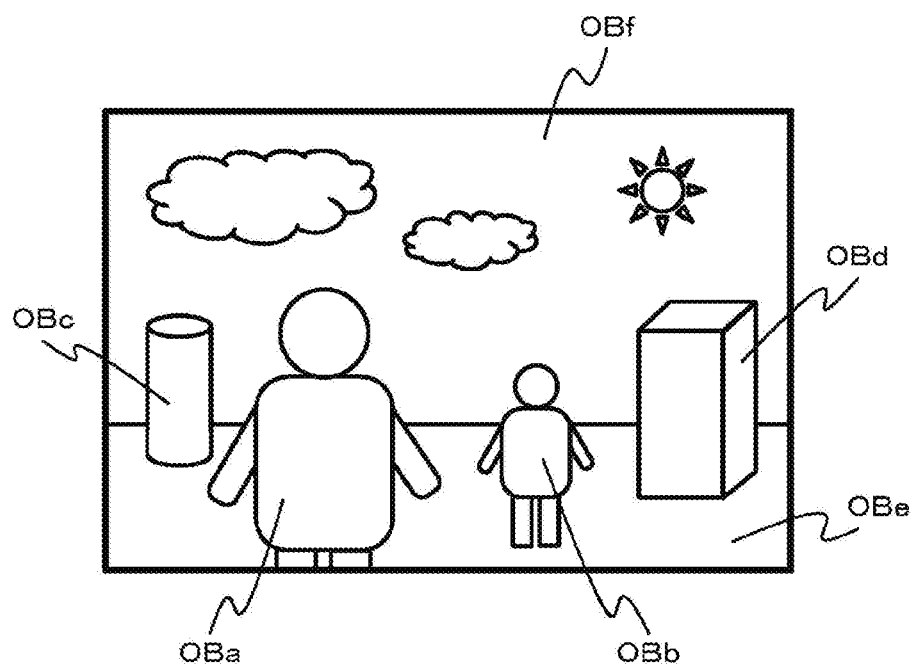
FIG. 2 is a view depicting an exemplary picked up image.

FIG. 2 depicts an exemplary picked up image indicated by the image data supplied from the signal processing section 23. The picked up image includes subjects OBa, OBb, OBc and OBd, a ground OBe, and a sky OBf. In the description that follows, the subjects OBa and OBb will be referred to as the subject of interest and the image region of the subjects OBa and OBb as the subject region.

Figure 3A:
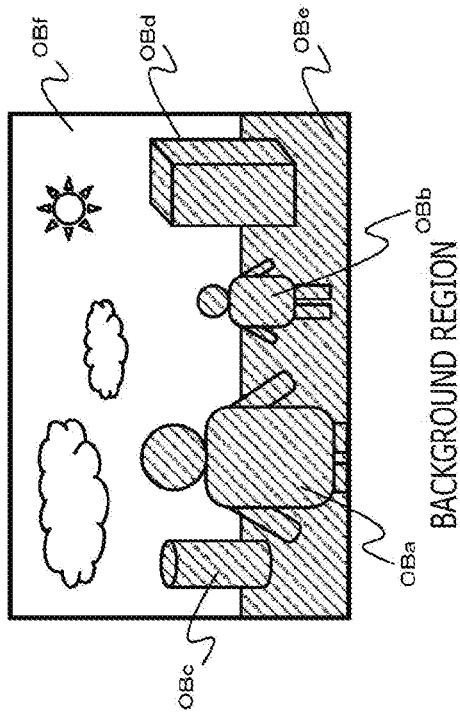
FIGS. 3A and 3B are views depicting exemplary subject regions and background regions.
Figure 3B:
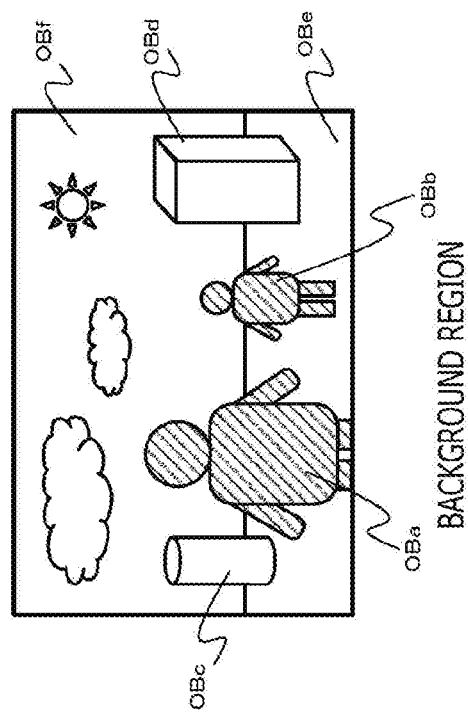

FIGS. 3A and 3B depict exemplary subject regions and background regions. The region extracting section 31 extracts a subject region and a background region individually. In FIGS. 3A, 3B, and 4 to be discussed later, the regions that have yet to be extracted are shaded. As depicted in FIG. 3A, the region extracting section 31 extracts the image region of the subjects OBa and OBb as the subject region and, in order to suppress overexposure of the sky, for example, extracts the image region of the sky OBf as the background region. In this case, the image region of the subjects OBc and OBd and that of the ground OBe are processed as regions being neither the subject region nor the background region.

Further, the region extracting section 31 may extract either the subject region or the background region and obtain the yet-to-be-extracted region as the other region. As depicted in FIG. 3B, the region extracting section 31 extracts the image region of the subjects OBa and OBb as the subject region and obtains the remaining image region as the background region.

Region extraction is performed by comparing, for example, a local characteristic amount calculated using image data with learning results of subject models. The region of which the calculated local characteristic amount is similar to the learning result of the subject of interest is extracted as the subject region. Furthermore, region extraction is not limited to the technique of using local characteristic amounts. Alternatively, the subject region and the background region may be extracted in such a manner that the foreground close to, or within a predetermined distance of, the imaging apparatus is obtained as the subject and the remaining region as the background on the basis of a distance to the subject or the like. Distance information may be acquired from a ranging sensor attached to the imaging apparatus 10 or obtained on the basis of pixel signals from image plane phase difference pixels disposed in the image sensor of the image sensor section 22.

The whole region photometric section 32w performs photometric processing on the whole screen based on the image data supplied from the signal processing section 23. The whole region photometric section 32w outputs the photometric values calculated by photometric processing to the region-specific exposure control amount calculating section 33.

The subject region photometric section 32m performs photometric processing on the subject region based on the image data of the subject region supplied from the region extracting section 31. The subject region photometric section 32m outputs the photometric values calculated by photometric processing to the region-specific exposure control amount calculating section 33.

The background region photometric section 32b performs photometric processing on the background region based on the image data of the background region supplied from the region extracting section 31. The background region photometric section 32b outputs the photometric values calculated by photometric processing to the region-specific exposure control amount calculating section 33.

The region-specific exposure control amount calculating section 33 includes a whole region exposure control amount calculating section 33w, a subject region exposure control amount calculating section 33m, and a background region exposure control amount calculating section 33b, thereby calculating the exposure control amount for each of the regions. Incidentally, the exposure control amount is an EV value (exposure value), for example. Alternatively, the exposure control amount may be a relative value representing the amount of increase or decrease relative to the current EV value. The whole region exposure control amount calculating section 33w calculates a whole region exposure control amount based on the photometric values supplied from the whole region photometric section 32w. The subject region exposure control amount calculating section 33m calculates a subject region exposure control amount based on the photometric values supplied from the subject region photometric section 32m. The background region exposure control amount calculating section 33b calculates a background region exposure control amount based on the photometric values supplied from the background region photometric section 32b. The region-specific exposure control amount calculating section 33 outputs to the exposure control amount calculating section 34 the region exposure control amounts calculated by the whole region exposure control amount calculating section 33w, by the subject region exposure control amount calculating section 33m, and by the background region exposure control amount calculating section 33b.

The exposure control amount calculating section 34 calculates the exposure control amount for use in exposure adjustment (this amount is also referred to as the final exposure control amount). The exposure control amount calculating section 34 sets the contribution ratio of the subject region and that of the background region (referred to as the final contribution ratios hereunder) at the time of calculating the final exposure control amount, and calculates the final exposure control amount by mixing the subject region exposure control amount with the background region exposure control amount in accordance with the final contribution ratios thus set. The exposure control amount calculating section 34 sets the final contribution ratios based on the result of comparison between the subject region exposure control amount and the background region exposure control amount and on the operation of flash light emission by the flash unit 61. For example, when the contribution ratio of the subject region is 100%, the contribution ratio of the background region is set to 0%, with the subject region exposure control amount regarded as the final exposure control amount.

In the case where the region exposure control amount has yet to be calculated either for the subject region or for the background region, the exposure control amount calculating section 34 supplements the region exposure control amount of the region on which the calculation has yet to be performed.

FIG. 4 is a view explaining the process of supplementing the region exposure control amount. The whole region includes the subject region and background region. That is, the background region is obtained by inverting the subject region. In this case, the following expression (1) defines the relation between an exposure control amount difference (CVw–CVm) between the whole region exposure control amount CVw and the subject region exposure control amount CVm on one hand, and an exposure control amount difference (CVw–CVb) between the whole region exposure control amount CVw and the background region exposure control amount CVb on the other hand:

$$(CVw-CVm)=-(CVw-CVb) \quad (1)$$

Thus, in the case where the background region exposure control amount CVb has yet to be calculated, the background region exposure control amount CVb is calculated on the basis of the expression (2) below. In the case where the subject region exposure control amount CVm has yet to be calculated, the subject region exposure control amount CVm is calculated on the basis of the expression (3) below.

$$CVb=2CVw-CVm \quad (2)$$

$$CVm=2CVw-CVb \quad (3)$$

The light emission control amount calculating section 41 determines whether it is necessary to perform flash light emission with the flash unit 61 on the basis of the exposure control amount supplied from a photometric sensor (not depicted) disposed in the imaging apparatus 10 or from the exposure control amount calculating section 34. The light emission control amount calculating section 41 outputs the result of the determination on flash light emission to the exposure control amount calculating section 34. In the case where flash light emission is determined to be necessary, the light emission control amount calculating section 41 calculates a light emission control amount for setting the light emission amount of the flash unit 61 on the basis of the final exposure control amount. The light emission control amount calculating section 41 outputs the light emission control amount thus calculated to the control section 55.

The user interface section 51 includes control switches, operation buttons, and a touch panel, for example. The user interface section 51 outputs operation signals representing user operations (shutter operations, diverse setting operations, etc.) to the control section 55.

The control section 55 includes a CPU (Central Processing Unit), a ROM (Read Only Memory), and a RAM (Random Access Memory). The ROM (Read Only Memory) stores various programs to be executed by the CPU (Central Processing Unit). The RAM (Random Access Memory) stores information such as various parameters. The CPU executes the various programs stored in the ROM and, on the basis of the operation signals from the user interface section 51, controls the components involved in such a manner that the imaging apparatus 10 carries out the operations reflecting the user's operations.

The control section 55 further includes an exposure control section 55a that controls exposure and a light emission control section 55b that controls flash light emission. The exposure control section 55a sets shutter speed, aperture value, and ISO value based on the final exposure control amount calculated by the exposure control amount calculating section 34. The exposure control section 55a outputs an exposure control signal reflecting the settings to the imaging optical system block 21 and to the image sensor section 22. Furthermore, the exposure control section 55a outputs the control values (shutter speed, aperture value, and ISO value) at this point to the region-specific exposure control amount calculating section 33, so that the control values will be used next time the control amounts are calculated. The light emission control section 55b generates a light emission control signal based on the light emission control value supplied from the light emission control amount calculating section 41, and outputs the generated light emission control signal to the flash unit 61.

The flash unit 61 performs flash light emission in keeping with the timing of the shutter operation using the light emission amount based on the light emission control signal supplied from the light emission control section 55b.

2. Operations of the Imaging Apparatus 2-1. First Operation Example

Figure 5:
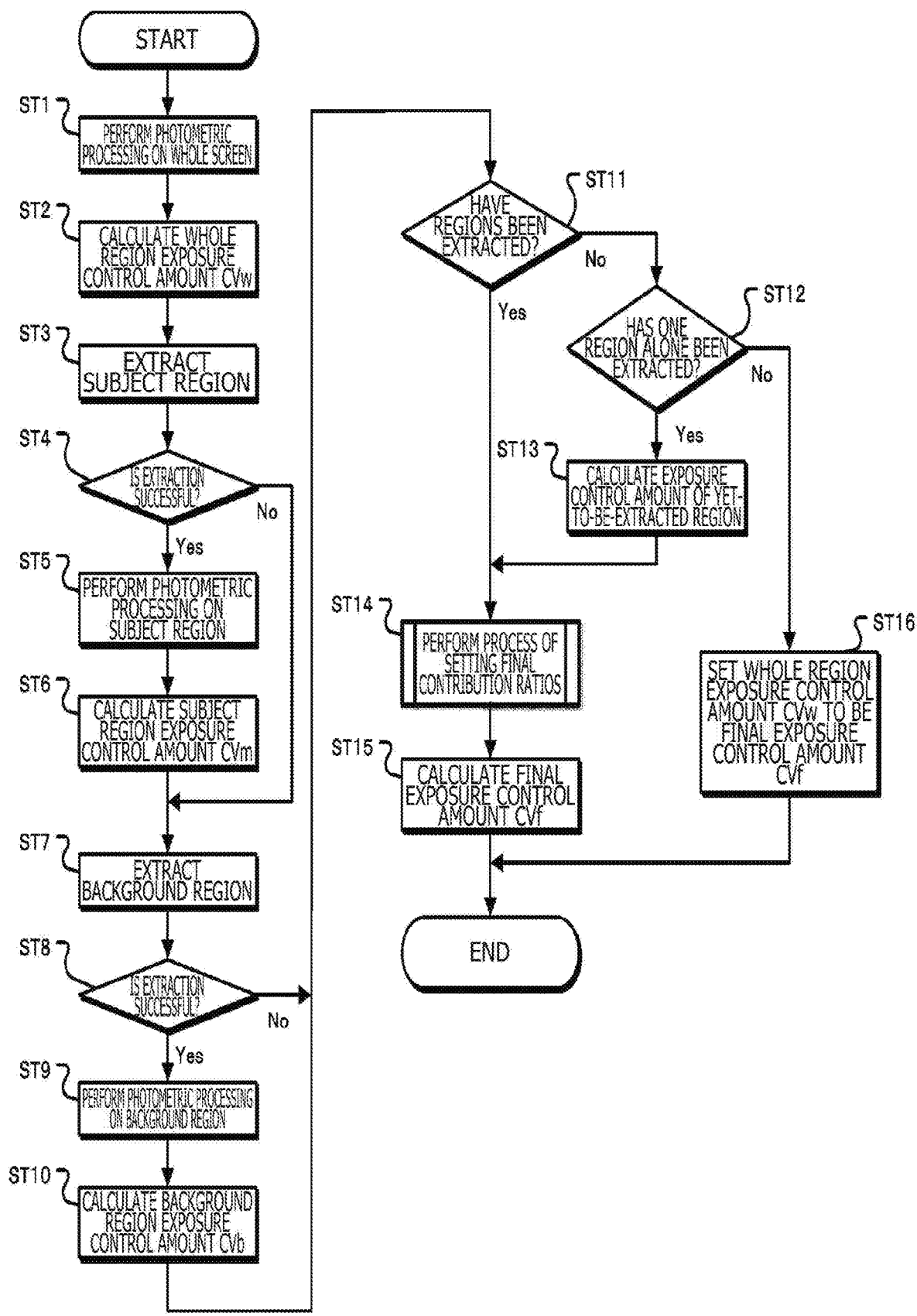
FIG. 5 is a flowchart depicting exemplary operations of calculating a final exposure control amount.

The operations of the imaging apparatus 10 are explained below. FIG. 5 is a flowchart depicting exemplary operations of calculating the final exposure control amount with the imaging apparatus. Depicted here is the case in which the subject region and the background region are extracted individually.

In step ST1, the imaging apparatus performs photometric processing on the whole screen. The whole region photometric section 32w in the imaging apparatus 10 calculates photometric values of the whole screen based on the image data supplied from the signal processing section 23. The whole region photometric section 32w then goes to step ST2.

In step ST2, the imaging apparatus calculates the whole region exposure control amount CVw. The whole region exposure control amount calculating section 33w in the imaging apparatus 10 calculates the whole region exposure control amount CVw for obtaining an appropriate exposure based on the photometric values calculated in step ST1. The whole region exposure control amount calculating section 33w then goes to step ST3.

In step ST3, the imaging apparatus extracts the subject region. The region extracting section 31 in the imaging apparatus 10 extracts the subject region using the image data supplied from the signal processing section 23. The region extracting section 31 then goes to step ST4.

In step ST4, the imaging apparatus determines whether the extraction is successful. In the case where the subject region is successfully extracted, the imaging apparatus 10 goes to step ST5. In the case where the extraction is unsuccessful, the imaging apparatus 10 goes to step ST7.

In step ST5, the imaging apparatus performs photometric processing on the subject region. The subject region photometric section 32m in the imaging apparatus 10 calculates photometric values based on the image data of the subject region supplied from the region extracting section 31. The subject region photometric section 32m then goes to step ST6.

In step ST6, the imaging apparatus calculates the subject region exposure control amount CVm. The subject region exposure control amount calculating section 33m in the imaging apparatus 10 calculates the subject region exposure control amount CVm for obtaining an appropriate exposure based on the photometric values calculated in step ST5. The subject region exposure control amount calculating section 33m then goes to step ST7.

In step ST7, the imaging apparatus extracts the background region. The region extracting section 31 in the imaging apparatus 10 extracts the background region using the image data supplied from the signal processing section 23. The region extracting section 31 then goes to step ST8.

In step ST8, the imaging apparatus determines whether the extraction is successful. In the case where the background region is successfully extracted, the imaging apparatus 10 goes to step ST9. In the case where the extraction is not successful, the imaging apparatus 10 goes to step ST11.

In step ST9, the imaging apparatus performs photometric processing on the background region. The background region photometric section 32b in the imaging apparatus 10 calculates photometric values based on the image data of the background region supplied from the region extracting section 31. The background region photometric section 32b then goes to step ST10.

In step ST10, the imaging apparatus calculates the background region exposure control amount CVb. The background region exposure control amount calculating section 33b in the imaging apparatus 10 calculates the background region exposure control amount CVb for obtaining an appropriate exposure based on the photometric values calculated in step ST9. The background region exposure control amount calculating section 33b then goes to step ST11.

In step ST11, the imaging apparatus determines whether the regions have been extracted. In the case where the subject region and the background region have both been detected, the imaging apparatus 10 goes to step ST14. Otherwise the imaging apparatus 10 goes to step ST12.

In step ST12, the imaging apparatus determines whether only one of the regions has been extracted. In the case where either the subject region or the background region alone has been extracted, the imaging apparatus 10 goes to step ST13. In the case where neither the subject region nor the background region has been extracted, the imaging apparatus 10 goes to step ST16.

In step ST13, the imaging apparatus calculates the region exposure control amount of the region that has yet to be extracted. The exposure control amount calculating section 34 in the imaging apparatus 10 calculates the region exposure control amount of the yet-to-be-extracted region on the basis of the whole region exposure control amount of the whole region and the region exposure control amount of the extracted region. The exposure control amount calculating section 34 then goes to step ST14.

In step ST14, the imaging apparatus performs the process of setting the final contribution ratios. The final contribution ratios are contribution ratios for calculating the final exposure control amount for use in exposure adjustment. A final exposure control amount CVf is calculated by mixing the subject region exposure control amount CVm with the background region exposure control amount CVb at the mixing ratio of the final contribution ratios. In the process of setting the final contribution ratios, the region to be emphasized in the process of setting the final contribution ratios is determined on the basis of the flash light emission, subject region exposure control amount CVm, and background region exposure control amount CVb.

FIG. 6 lists the regions that are emphasized at the time the final contribution ratios are set. In the case where the flash unit 61 does not perform flash light emission, the exposure control amount calculating section 34 sets the final contribution ratios by emphasizing the subject region regardless of the subject region exposure control amount CVm and the background region exposure control amount CVb. In the case where flash light emission is to be performed, the exposure control amount calculating section 34 sets the final contribution ratios by emphasizing the region with the smaller region exposure control amount based on the result of comparison between the subject region exposure control amount CVm and the background region exposure control amount CVb. That is, in the case where the subject region exposure control amount CVm is larger than the background region exposure control amount CVb, the final contribution ratios are set by emphasizing the background region. In the case where the subject region exposure control amount CVm is smaller than the background region exposure control amount CVb, the final contribution ratios are set by emphasizing the subject region. The exposure control amount calculating section 34 calculates the final exposure control amount CVf by mixing the subject region exposure control amount CVm with the background region exposure control amount CVb at the mixing ratio of the final contribution ratios at which the contribution of the region exposure control amount of the region to be emphasized is the higher.

Figure 7:
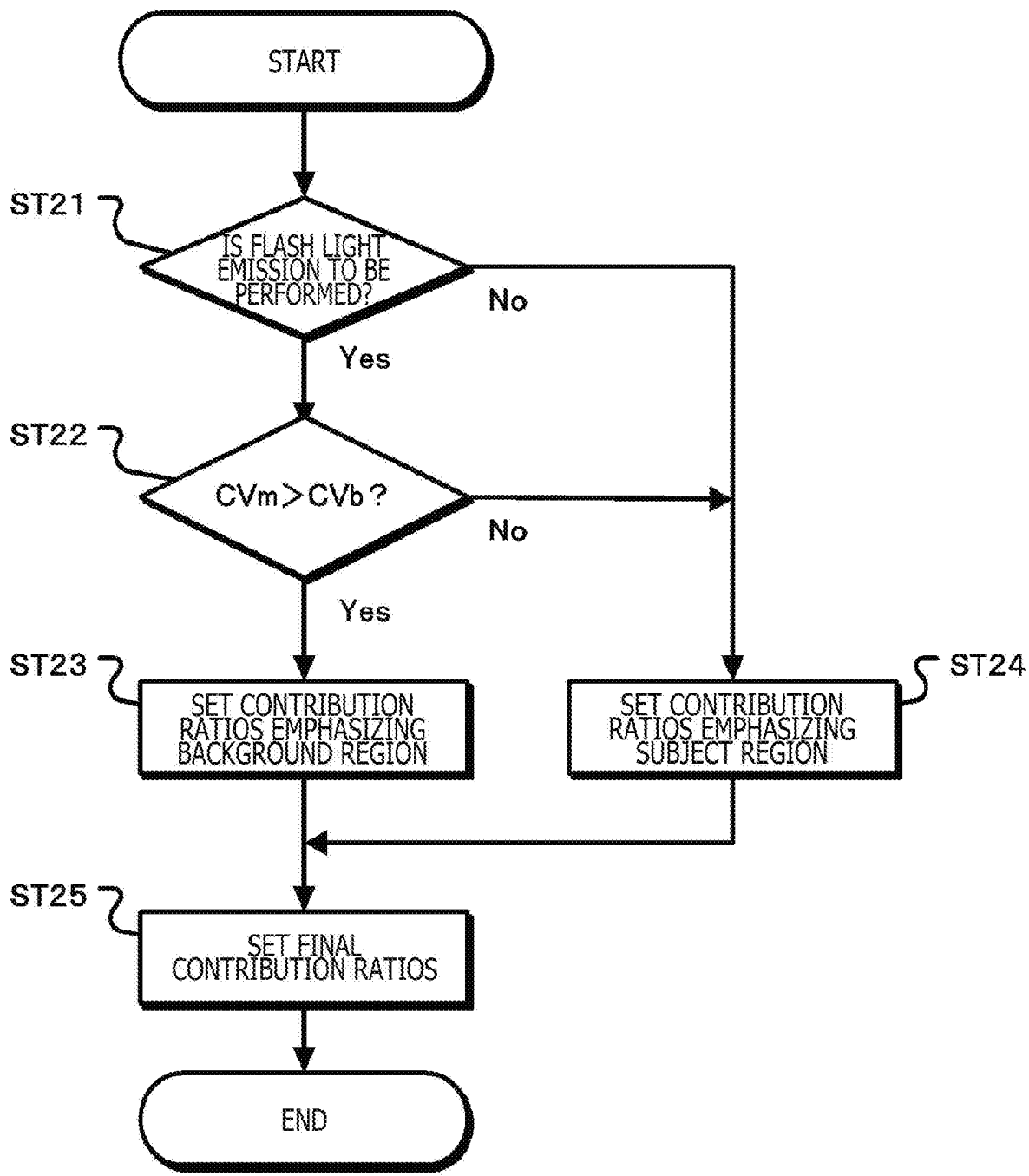
FIG. 7 is a flowchart depicting a process of setting the final contribution ratios.

FIG. 7 is a flowchart depicting the process of setting the final contribution ratios. In step ST21, the exposure control amount calculating section determines whether flash light emission is to be performed. In the case where the exposure control amount calculating section 34 determines that flash light emission is to be performed on the basis of the result of the determination on flash light emission supplied from the light emission control amount calculating section 41, the exposure control amount calculating section 34 goes to step ST22. In the case where the exposure control amount calculating section 34 determines that flash light emission is not to be performed, the exposure control amount calculating section 34 goes to step ST24.

In step ST22, the exposure control amount calculating section determines whether the subject region exposure control amount CVm is larger than the background region exposure control amount CVb. In the case where the subject region exposure control amount CVm is larger than the background region exposure control amount CVb, the exposure control amount calculating section 34 goes to step ST23. In the case where the subject region exposure control amount CVm is not larger than the background region exposure control amount CVb, the exposure control amount calculating section 34 goes to step ST24.

In step ST23, the exposure control amount calculating section sets the contribution ratio emphasizing the background region. The exposure control amount calculating section 34 sets temporary contribution ratios "Rmtmp:Rbtmp (>Rmtmp)" emphasizing the background region, before going to step ST25.

In step ST24, the exposure control amount calculating section sets the contribution ratio emphasizing the subject region. The exposure control amount calculating section 34 sets temporary contribution ratios "Rmtmp:Rbtmp (<Rmtmp)" emphasizing the subject region, before going to step ST25.

In step ST25, the exposure control amount calculating section sets the final contribution ratios. The exposure control amount calculating section 34 obtains the temporary contribution ratios "Rmtmp:Rbtmp" set in step ST23 or in step ST24 as the final contribution ratio "Rmf:Rbf." The exposure control amount calculating section 34 then terminates the process of setting the final contribution ratios.

Returning to FIG. 5, the final contribution ratio setting process is performed in step ST14. Thereafter, in step ST15, the imaging apparatus calculates the final exposure control amount CVf. The exposure control amount calculating section 34 calculates the final exposure control amount CVf for use in exposure adjustment by mixing the subject region exposure control amount CVm calculated in step ST6 with the background region exposure control amount CVb calculated in step ST10 at the mixing ratio of the final contribution ratio "Rmf:Rbf" set in step ST14. The exposure control amount calculating section 34 then terminates the operations of calculating the final exposure control amount. In the case where the subject region exposure control amount CVm is equal to the background region exposure control amount CVb, the final exposure control amount CVf becomes equal to the subject region exposure control amount CVm and to the background region exposure control amount CVb regardless of the final contribution ratio "Rmf:Rbf."

Going from step ST12 to step ST16, the exposure control amount calculating section sets the whole region exposure control amount CVw as the final exposure control amount CVf. Since the subject region and the background region have yet to be extracted, the exposure control amount calculating section 34 in the imaging apparatus 10 obtains the whole region exposure control amount CVw as the final exposure control amount CVf. The exposure control amount calculating section 34 then terminates the process of calculating the final exposure control amount.

The operations of calculating the final exposure control amount are not limited to the sequence depicted in FIG. 5. For example, any one of three groups of processes, i.e., a group of processes in steps ST1 and ST2, a group of processes in steps ST3 to ST6, and a group of processes in steps ST7 to ST10, may be executed earlier than the other groups.

Figure 8:
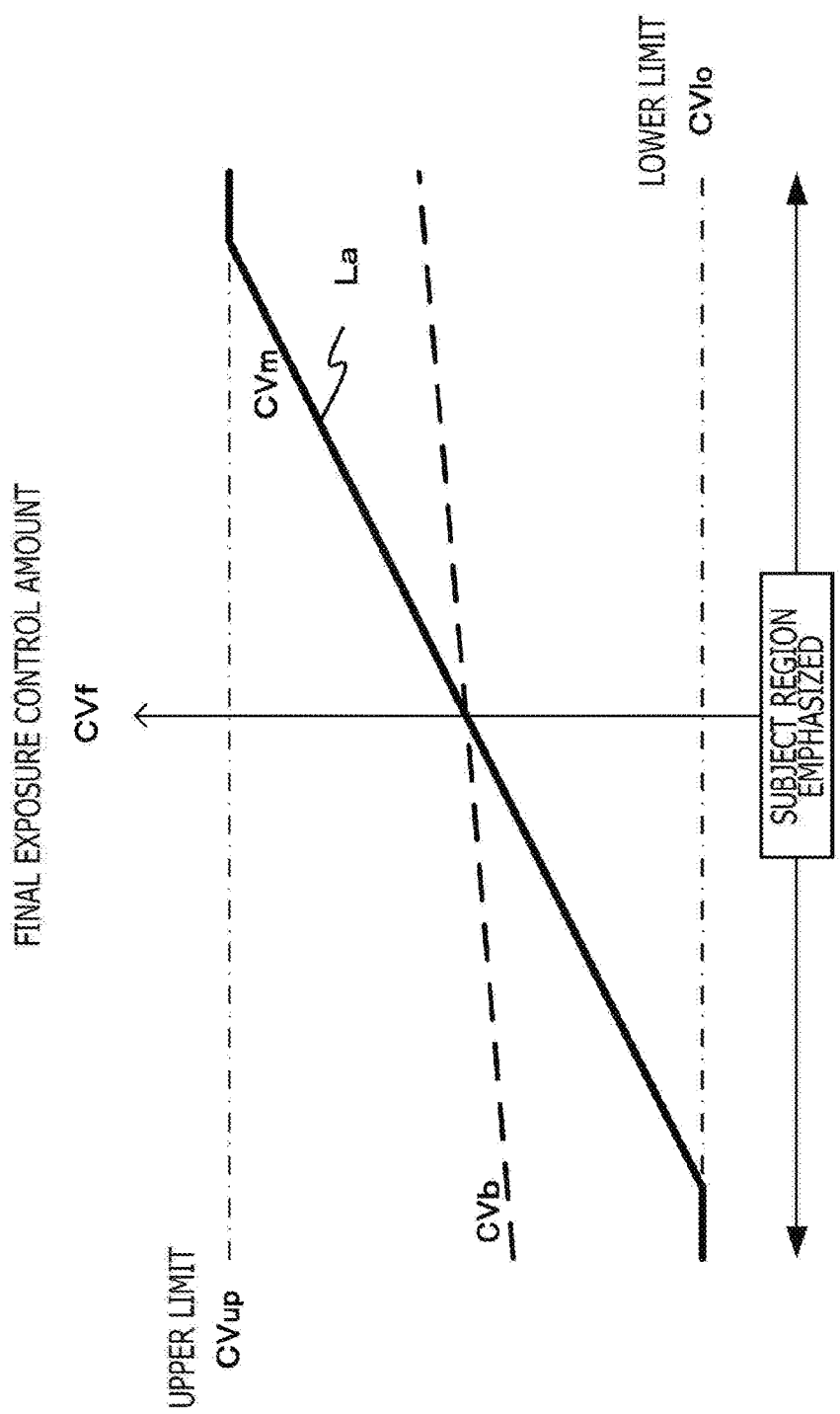
FIG. 8 is a view depicting an exemplary transition of the final exposure control amount in a case where flash light emission is not to be performed.

FIG. 8 depicts an exemplary transition of the final exposure control amount in the case where flash light emission is not to be performed. For the purpose of simplified explanation, the contribution ratio of the region to be emphasized is assumed to be 100%. The subject region exposure control amount CVm and the background region exposure control amount CVb are examples here, with an upper limit CVup and a lower limit CVlo set on the exposure control amounts.

In the case where flash light emission is not to be performed by the flash unit 61, the region to be emphasized is set to be the subject region as discussed above. Because the contribution ratio of the region to be emphasized is 100%, the final exposure control amount CVf becomes equal to the subject region exposure control amount CVm. Furthermore, since the upper limit CVup and the lower limit CVlo are set on the exposure control amounts, the final exposure control amount CVf is limited by the upper limit CVup and by the lower limit CVlo. Thus, the final exposure control amount CVf transitions as indicated by a solid line La, as with the subject region exposure control amount CVm. In the case where the contribution ratio of the region to be emphasized is lower than 100%, the gradient of the solid line La between the upper limit CVup and the lower limit CVlo is more moderate the smaller the contribution ratio becomes.

Figure 9:
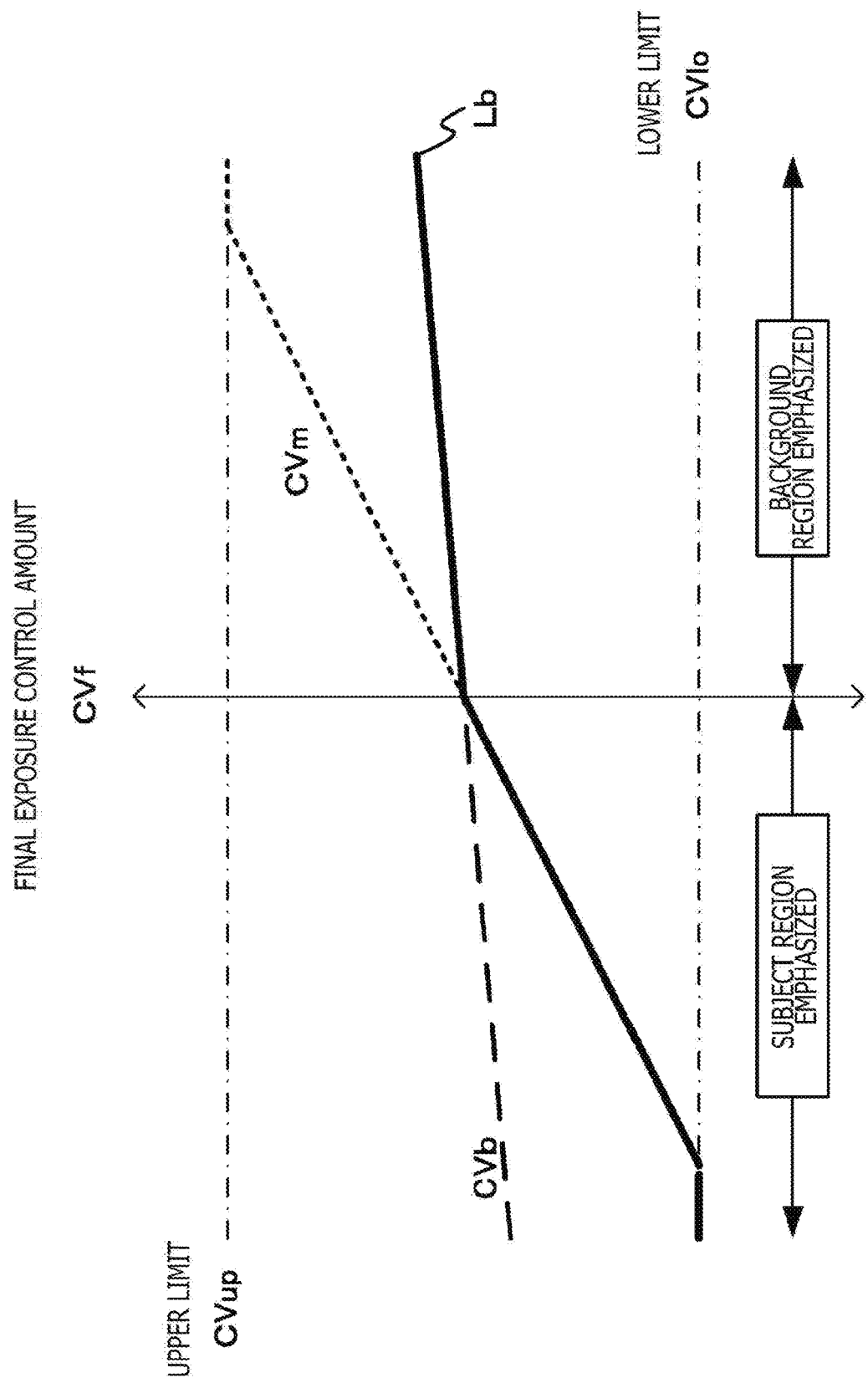
FIG. 9 is a view depicting an exemplary transition of the final exposure control amount in a case where flash light emission is to be performed.

FIG. 9 depicts an exemplary transition of the final exposure control amount in the case where flash light emission is to be performed. For the purpose of simplified explanation, the contribution ratio of the region to be emphasized is assumed to be 100%. Also, the subject region exposure control amount CVm and the background region exposure control amount CVb are examples here, with the upper limit CVup and the lower limit CVlo set on the exposure control amounts.

In the case where the flash unit 61 performs flash light emission, with the subject region exposure control amount CVm larger than the background region exposure control amount CVb as discussed above, the region to be emphasized is set to be the background region. In the case where the subject region exposure control amount CVm is smaller than the background region exposure control amount CVb, the region to be emphasized is set to be the subject region. Since the contribution ratio of the region to be emphasized is 100%, the final exposure control amount CVf is equal to the subject region exposure control amount CVm in the case where the subject region is emphasized, or is equal to the background region exposure control amount CVb in the case where the background region is emphasized. Because the upper limit CVup and the lower limit CVlo are set on the exposure control amounts, the final exposure control amount CVf is limited by the upper limit CVup and by the lower limit CVlo. Thus, the final exposure control amount CVf transitions as indicated by a solid line Lb. In the case where the contribution ratio of the region to be emphasized is lower than 100%, the gradient of the solid line Lb between the upper limit CVup and the lower limit CVlo is more moderate the smaller the contribution ratio is in the case where the subject region is emphasized, or the gradient is steeper the smaller the contribution ratio is in the case where the background region is emphasized.

According to the present technology, as discussed above, the final exposure control amount is determined on the basis of the operation of flash light emission by the flash unit 61, the exposure control amount of the subject region, and the exposure control amount of the background region. Thus, regardless of whether or not flash light emission is to be performed, it is possible automatically to perform exposure control for obtaining a picked up image with natural, balanced brightness. Even in the case where one of or both the subject and the background region are not extracted, stable exposure control is carried out.

2-2. Second Operation Example

A second example of the operations of the imaging apparatus 10 is explained below. In the case where there is a significant difference in luminance between the subject region and the background region, it may happen that a high contribution ratio of one region renders the other region too bright or too dark. Thus, the second operation example involves performing exposure control in such a manner that even in the case where a considerable difference in luminance between the subject region and the background region entails a high contribution ratio of one of the regions, the other region will not be rendered too bright or too dark.

In the case where exposure is controlled such that the high contribution ratio of one region will not render the other region too bright or too dark, there may be little need for reducing the difference in luminance between the background region and the subject region by putting the subject region in an overexposed state. Thus, in the second operation example, the contribution ratios are adjusted in the case where the subject region exposure control amount CVm is larger than the background region exposure control amount CVb, with the subject region not adjusted to be overexposed.

Figure 10:
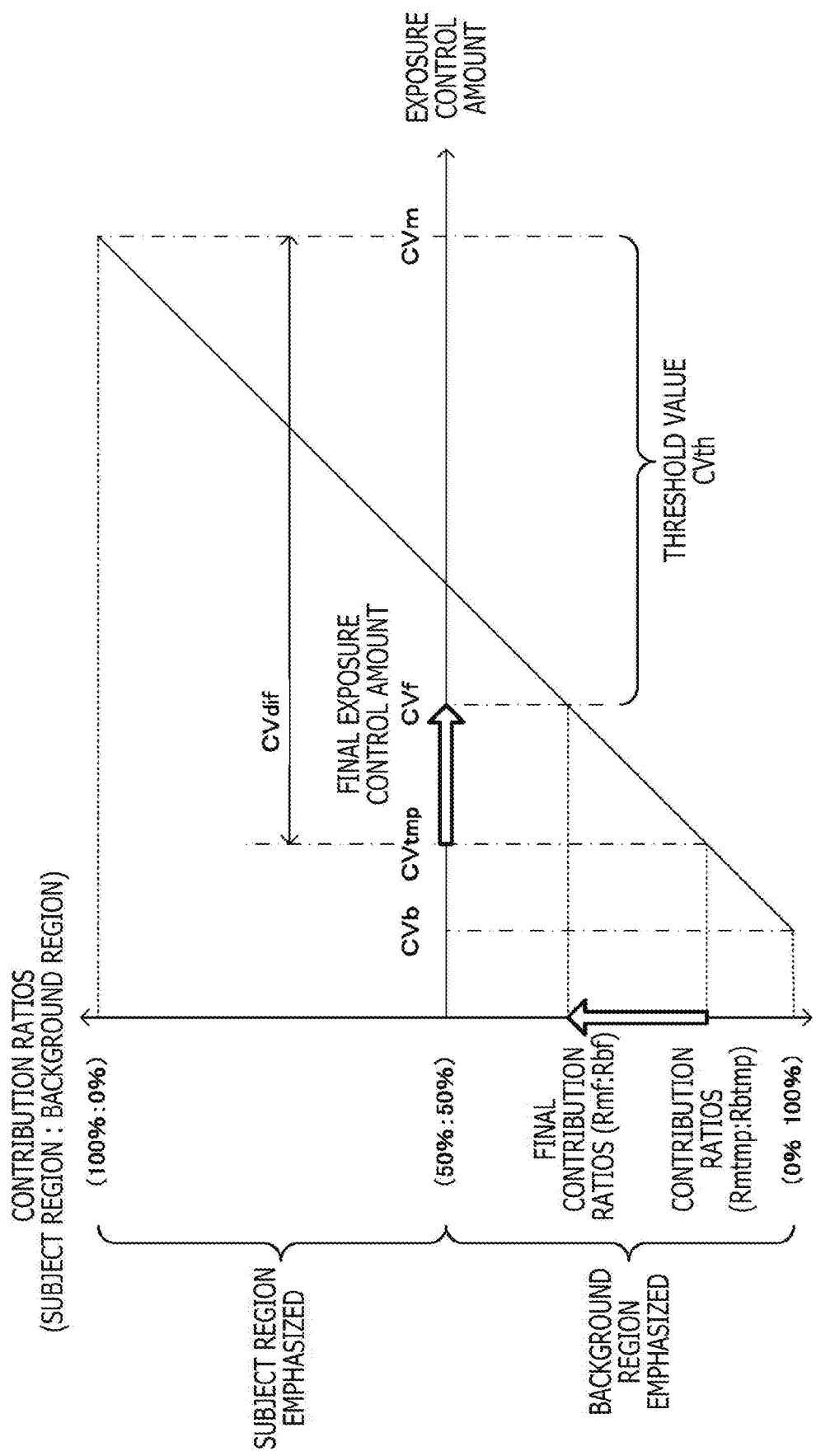
FIG. 10 is a view depicting exemplary relations between the exposure control amount and contribution ratios.

FIG. 10 depicts exemplary relations between the exposure control amount and contribution ratios, with the subject region exposure control amount CVm larger than the background region exposure control amount CVb. In the case where the region to be emphasized is set to be the background region here, the exposure control amount calculating section 34 sets temporary contribution ratios "Rmtmp: Rbtmp (>Rmtmp)" emphasizing the background region. In the case where an exposure control amount difference CVdif between an exposure control amount CVtmp of the temporary contribution ratios "Rmtmp:Rbtmp (>Rmtmp)" on one hand and the subject region exposure control amount CVm with the lower contribution ratio exceeds a threshold value Cth on the other hand, the exposure control amount calculating section 34 adjusts the temporary contribution ratios in such a manner that the exposure control amount difference CVdif between the exposure control amount CVtmp and the subject region exposure control amount CVm does not exceed the threshold value CVth. For example, the exposure control amount calculating section 34 adjusts the temporary contribution ratios such that the exposure control amount difference CVdif becomes equal to the threshold value CVth, with the adjusted contribution ratios set as the final contribution ratios "Rmf:Rbf (>Rmf)." In the case where the exposure control amount difference CVdif does not exceed the threshold value CVth, the exposure control amount calculating section 34 sets the temporary contribution ratios "Rmtmp:Rbtmp (>Rmtmp)" as the final contribution ratios "Rmf:Rbf (>Rmf)."

Figure 11:
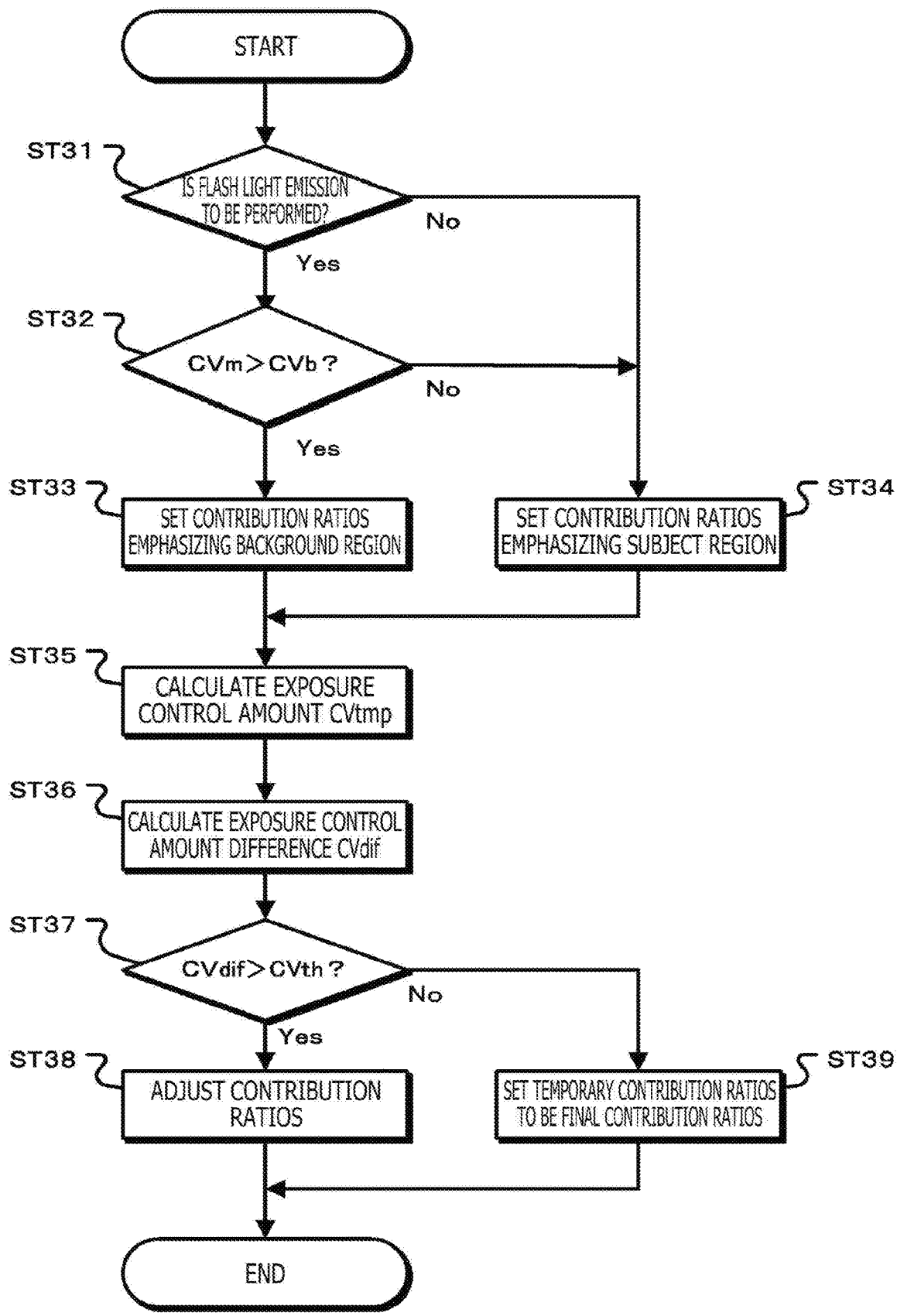
FIG. 11 is a flowchart depicting a second process of setting the final contribution ratios.

FIG. 11 is a flowchart depicting a second process of setting the final contribution ratios. The flowchart indicates the case in which the final contribution ratios are set in such a manner that the exposure control amount difference CVdif does not exceed the threshold value CVth. It is to be noted that the processing in steps ST31 to ST34 in FIG. 11 corresponds to the processing in steps ST21 to ST24 in FIG. 7.

In step ST31, the exposure control amount calculating section determines whether flash light emission is to be performed. In the case where the exposure control amount calculating section 34 determines that flash light emission is to be performed on the basis of the result of the determination on flash light emission supplied from the light emission control amount calculating section 41, the exposure control amount calculating section 34 goes to step ST32. In the case where the exposure control amount calculating section 34 determines that flash light emission is not to be performed, the exposure control amount calculating section 34 goes to step ST34.

In step ST32, the exposure control amount calculating section determines whether the subject region exposure control amount CVm is larger than the background region exposure control amount CVb. In the case where the subject region exposure control amount CVm is larger than the background region exposure control amount CVb, the exposure control amount calculating section 34 goes to step ST33. In the case where the subject region exposure control amount CVm is not larger than the background region exposure control amount CVb, the exposure control amount calculating section 34 goes to step ST34.

In step ST33, the exposure control amount calculating section sets the contribution ratios emphasizing the background region. The exposure control amount calculating section 34 sets the temporary contribution ratios "Rmtmp: Rbtmp (>Rmtmp)" emphasizing the background region, and goes to step ST35.

In step ST34, the exposure control amount calculating section sets the contribution ratios emphasizing the subject region. The exposure control amount calculating section 34 sets the temporary contribution ratios "Rmtmp:Rbtmp (<Rmtmp)" emphasizing the subject region, and goes to step ST35.

In step ST35, the exposure control amount calculating section calculates an exposure control amount CVtmp corresponding to the temporary contribution ratios. The exposure control amount calculating section 34 calculates the exposure control amount CVtmp by mixing the subject region exposure control amount CVm with the background region exposure control amount CVb at the mixing ratio of the temporary contribution ratios "Rmtmp:Rbtmp" set in step ST33 or in step ST34. The exposure control amount calculating section 34 then goes to step ST36.

In step ST36, the exposure control amount calculating section calculates an exposure control amount difference CVdif. The exposure control amount calculating section 34 calculates the exposure control amount difference CVdif between the exposure control amount CVtmp calculated in step ST35 on one hand, and the exposure control amount with the lower contribution ratio on the other hand. The exposure control amount calculating section 34 then goes to step ST37.

In step ST37, the exposure control amount calculating section compares the exposure control amount difference CVdif with the threshold value CVth. The exposure control amount calculating section 34 compares the exposure control amount difference CVdif calculated in step ST36 with the predetermined threshold value CVth. In the case where the exposure control amount difference CVdif is larger than the threshold value CVth, the exposure control amount calculating section 34 goes to step ST38. In the case where the exposure control amount difference CVdif is not larger than the threshold value CVth, the exposure control amount calculating section 34 goes to step ST39.

In step ST38, the exposure control amount calculating section adjusts the contribution ratios. The exposure control amount calculating section 34 adjusts the temporary contribution ratios in such a manner that the exposure control amount difference CVdif falls within the threshold value CVth, e.g., that the exposure control amount difference CVdif becomes equal to the threshold value CVth. The exposure control amount calculating section 34 sets the adjusted contribution ratios as the final contribution ratios "Rmf:Rbf," and terminates the process of setting the final contribution ratios.

In step ST39, the exposure control amount calculating section sets the temporary contribution ratios to be the final contribution ratios. The exposure control amount calculating section 34 sets the temporary contribution ratios "Rmtmp:Rbtmp" as the final contribution ratios "Rmf:Rbf," and terminates the process of setting the final contribution ratios.

Thereafter, as in the first operation example, the final exposure control amount CVf for use in exposure adjustment is calculated by mixing the subject region exposure control amount CVm with the background region exposure control amount CVb at the mixing ratio of the final contribution ratios "Rmf:Rbf." Exposure control is then performed on the basis of the calculated final exposure control amount CVf.

Figure 12:
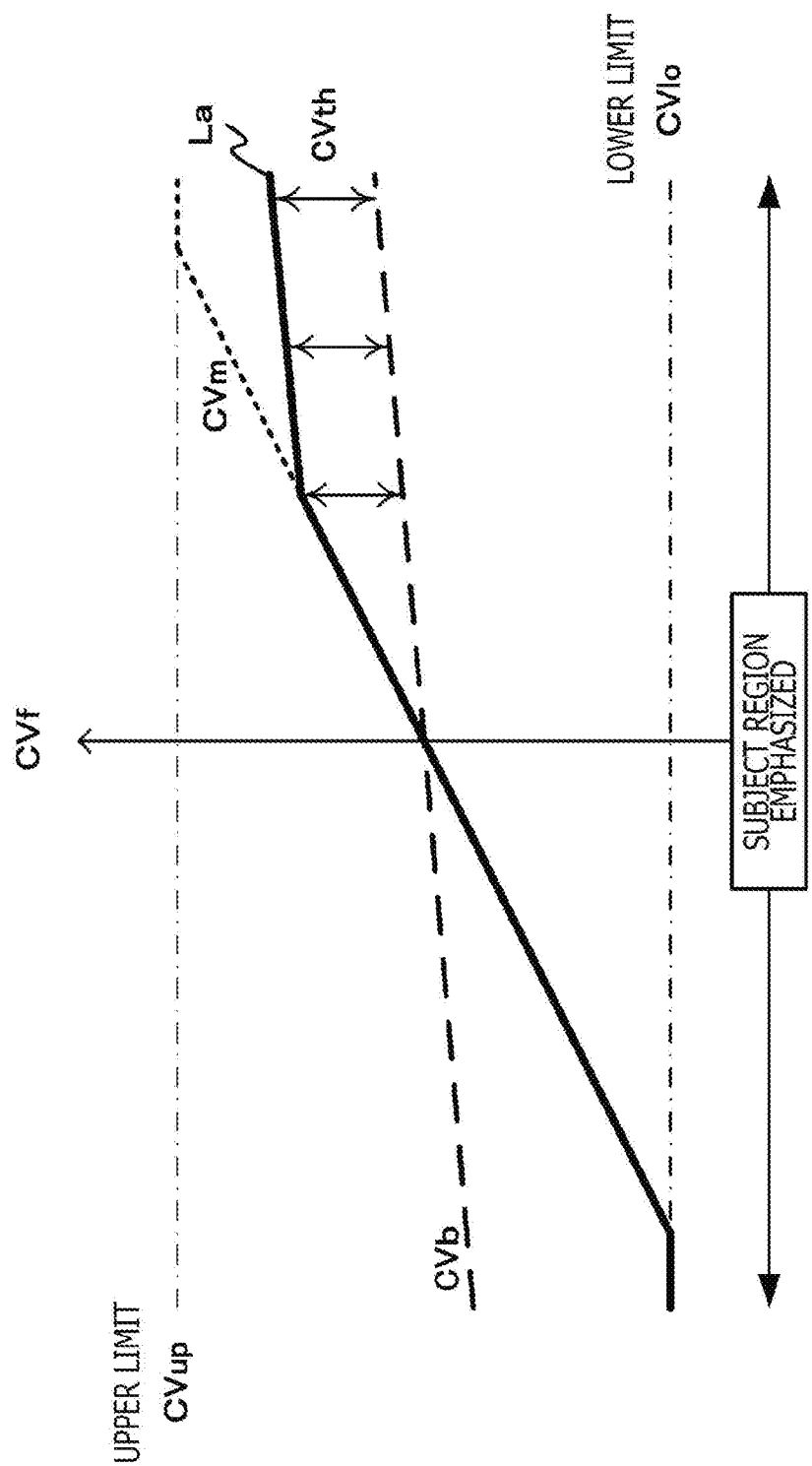
FIG. 12 is a view depicting an exemplary transition of the final exposure control amount in the case where flash light emission is not to be performed.

FIG. 12 depicts an exemplary transition of the final exposure control amount in the case where flash light emission is not to be performed. For the purpose of simplified explanation, the contribution ratio of the region to be emphasized is assumed to be 100%. The subject region exposure control amount CVm and the background region exposure control amount CVb are examples here, with the upper limit CVup and the lower limit CVlo set on the exposure control amounts.

In the case where flash light emission is not to be performed by the flash unit 61, the region to be emphasized is set to be the subject region as discussed above. Because the contribution ratio of the region to be emphasized is 100%, the final exposure control amount CVf becomes equal to the subject region exposure control amount CVm. Furthermore, since the upper limit CVup and the lower limit CVlo are set on the exposure control amounts, the final exposure control amount CVf is limited by the upper limit CVup and by the lower limit CVlo. In the case where the subject region exposure control amount CVm is larger than the background region exposure control amount CVb and where the exposure control amount difference CVdif between the exposure control amount CVtmp calculated on the basis of the temporary contribution ratios on one hand and the background region exposure control amount CVb with the lower contribution ratio on the other hand exceeds the threshold value Cth, the temporary contribution ratios are adjusted in such a manner that the exposure control amount difference CVdif falls within the threshold value CVth, e.g., that the exposure control amount difference CVdif becomes equal to the threshold value CVth. Thus, the final exposure control amount CVf transitions as indicated by a solid line La. In the case where the contribution ratio of the region to be emphasized is lower than 100%, the gradient of the solid line La between the upper limit CVup and the lower limit CVlo until the exposure control amount difference CVdif exceeds the threshold value Cth is more moderate the smaller the contribution ratio becomes.

Figure 13:
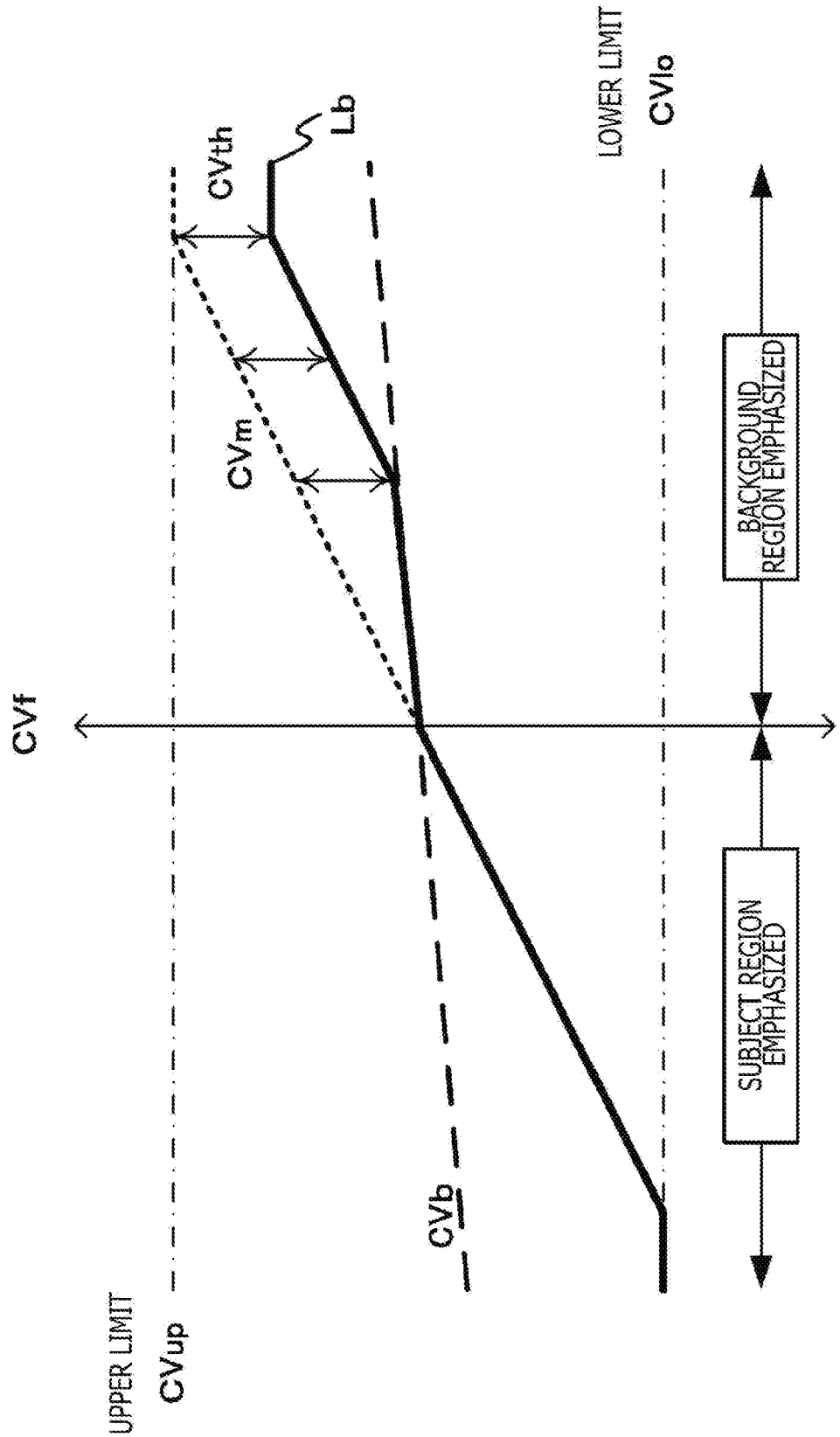
FIG. 13 is a view depicting an exemplary transition of the final exposure control amount in the case where flash light emission is to be performed.

FIG. 13 depicts an exemplary transition of the final exposure control amount in the case where flash light emission is to be performed. For the purpose of simplified explanation, the contribution ratio of the region to be emphasized is assumed to be 100%. Also, the subject region exposure control amount CVm and the background region exposure control amount CVb are examples here, with the upper limit CVup and the lower limit CVlo set on the exposure control amounts.

When the flash unit 61 performs flash light emission, in the case where the subject region exposure control amount CVm is larger than the background region exposure control amount CVb as discussed above, the region to be emphasized is set to be the background region. In the case where the subject region exposure control amount CVm is smaller than the background region exposure control amount CVb, the region to be emphasized is set to be the subject region. Since the contribution ratio of the region to be emphasized is 100%, the final exposure control amount CVf is equal to the subject region exposure control amount CVm in the case where the subject region is emphasized, or is equal to the background region exposure control amount CVb in the case where the background region is emphasized. Because the upper limit CVup and the lower limit CVlo are set on the exposure control amounts, the final exposure control amount CVf is limited by the upper limit CVup and by the lower limit CVlo. Furthermore, in the case where the subject region exposure control amount CVm is larger than the background region exposure control amount CVb and where the exposure control amount difference CVdif between the exposure control amount CVtmp calculated on the basis of the temporary contribution ratios on one hand and the subject region exposure control amount CVm with the lower contribution ratio on the other hand exceeds the threshold value Cth, the temporary contribution ratios are adjusted in such a manner that the exposure control amount difference CVdif falls within the threshold value CVth, e.g., that the exposure control amount difference CVdif becomes equal to the threshold value CVth. Thus, the final exposure control amount CVf transitions as indicated by a solid line Lb. In the case where the contribution ratio of the region to be emphasized is lower than 100%, the gradient of the solid line Lb between the upper limit CVup and the lower limit CVlo until the exposure control amount difference CVdif exceeds the threshold value Cth is more moderate the smaller the contribution ratio becomes in the case where the subject region is emphasized, or the gradient is steeper the smaller the contribution ratio becomes in the case where the background region is emphasized.

In the second operation example, as described above, in the case where the subject region exposure control amount CVm is larger than the background region exposure control amount CVb and where the region to be emphasized is set to be the background region, exposure control is performed using the final contribution ratios adjusted in such a manner that the exposure control amount difference CVdif does not exceed the threshold value Cth. That is, the final contribution ratios are adjusted in such a manner that the difference between the final exposure control amount calculated on the basis of the set final contribution ratios on one hand and the exposure control amount of the region with the lower contribution ratio does not exceed the predetermined threshold value. Thus, the subject region is prevented from being overexposed in the case where, for example, the exposure is adjusted to conform to the background region typically in a scene where the background region is darker than the subject region (e.g., imaging at night or in front of a dark building).

In the above-described operations of calculating the final exposure control amount, in the case where the subject region exposure control amount CVm is larger than the background region exposure control amount CVb and where the region to be emphasized is set to be the background region, the final contribution ratios are not limited to being adjusted in such a manner that the exposure control amount difference CVdif does not exceed the threshold value Cth. Alternatively, the final contribution ratios may be adjusted on the basis of the result of comparison between the exposure control amount difference CVdif and the threshold value Cth. For example, in the case where the absolute value of the exposure control amount difference CVdif is larger than the threshold value Cth, the contribution ratios may be adjusted in such a manner that the absolute value of the exposure control amount difference CVdif does not exceed the threshold value Cth. In this case, operations are also performed to increase the luminance of the subject region in order to reduce the difference in luminance from the background region.

The second operation example described above provides advantageous effects similar to those of the first operation example. Furthermore, in the second operation example, adjustments are made in such a manner that the difference between the final exposure control amount on one hand and the exposure control amount of the region with the lower contribution ratio on the other hand does not exceed the threshold value. Thus, the second operation example permits acquisition of a picked up image with its subject and its background not too bright and not too dark, even in a scene where there is a significant difference in luminance between the subject and the background such as in a backlit situation.

2-3. Other Operation Examples

Other operation examples of the imaging apparatus 10 are explained below. One such operation example involves determining the final contribution ratios by use of imaging-related information, besides using the result of comparison in exposure control amount between the subject region and the background region and the flash light emission operation.

The imaging-related information refers to information related to acquisition of picked up images and to the acquired picked up images. The imaging-related information includes at least any one of imaging environment information, imaging setting information, image state information, or user setting information. The imaging environment information includes an external light illuminance and a distance to a subject. The imaging setting information includes any one of a shutter speed, an ISO speed, an aperture value, a distance, amount of flash light emission to the subject, or a flash reaching distance. The image state information includes any one of an area ratio between the subject region and the background region, the position of the subject region in the picked up image, or the amount of image blur of the background region. The user setting information includes an imaging mode and information indicative of which of the subject region and the background region is set to be the region to be emphasized.

The exposure control amount calculating section 34 determines the contribution ratio of the subject region and that of the background region at the time the final exposure control amount is calculated, on the basis of the result of comparison in exposure control amount between the subject region and the background region, the operation of flash light emission, and the imaging-related information. The exposure control amount calculating section 34 calculates the final exposure control amount by mixing the subject region exposure control amount with the background region exposure control amount in accordance with the determined contribution ratios. For example, in the case where the final contribution ratio of the subject region is 80% and the final contribution ratio of the background region is 20%, the exposure control amount calculating section 34 obtains the final exposure control amount by mixing the subject region exposure control amount with the background region exposure control amount at a ratio of 8 to 2.

In the case where the region exposure control amount of either the subject region or the background region has yet to be calculated, the exposure control amount calculating section 34 supplements the region exposure control amount of the yet-to-be-calculated region as discussed above.

Figure 14:
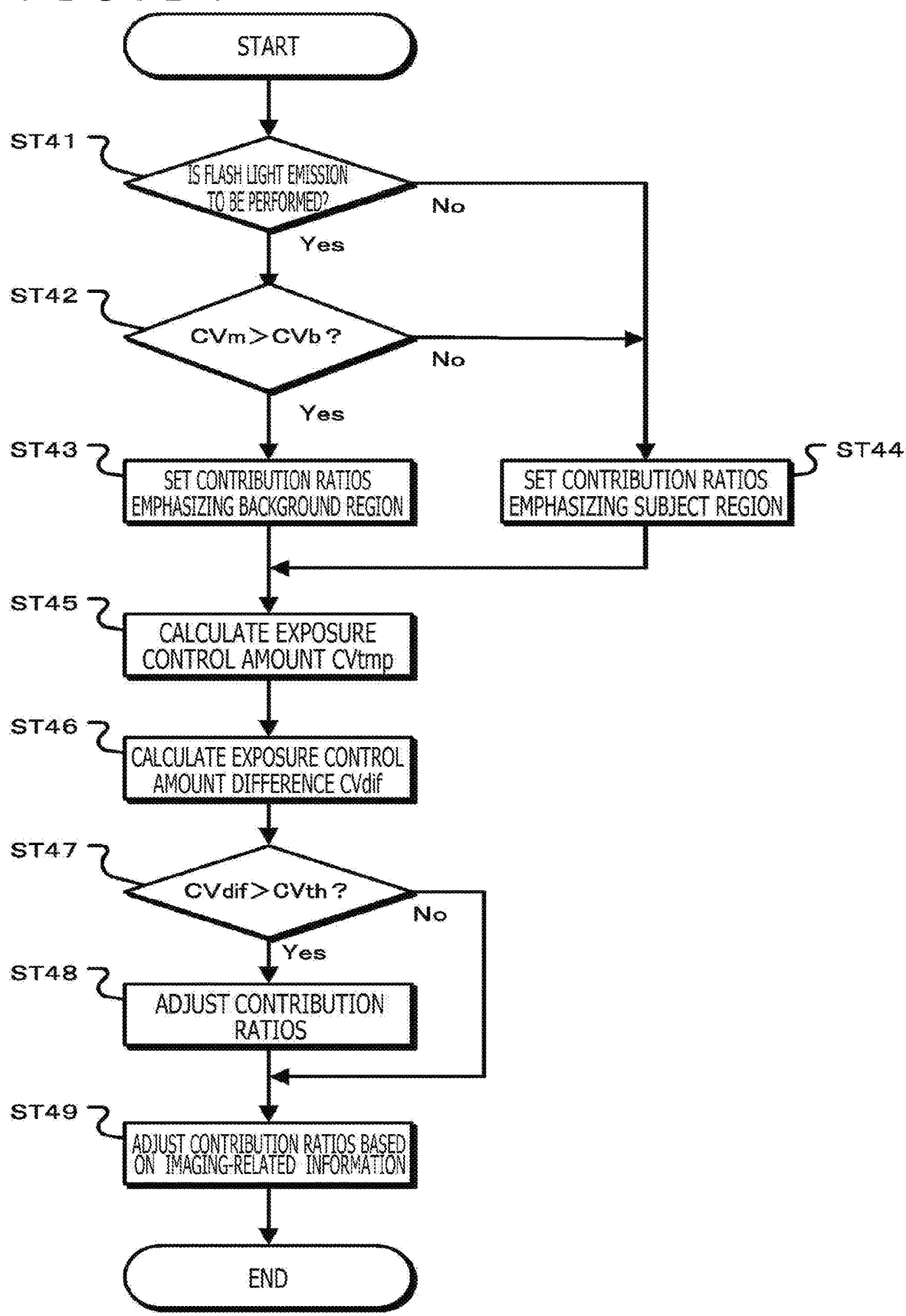
FIG. 14 is a flowchart depicting another process of setting the final contribution ratios.

FIG. 14 is a flowchart depicting another process of setting the final contribution ratios. The flowchart indicates the case in which the final contribution ratios are set on the basis of the result of comparison of the exposure control amounts, the operation of flash light emission, and the imaging-related information. It is to be noted that the processing in steps ST41 to ST48 in FIG. 14 corresponds to the processing in steps ST31 to ST38 in FIG. 11.

In step ST41, the exposure control amount calculating section determines whether flash light emission is to be performed. In the case where the exposure control amount calculating section 34 determines that flash light emission is to be performed on the basis of the result of the determination on flash light emission supplied from the light emission control amount calculating section 41, the exposure control amount calculating section 34 goes to step ST42. In the case where the exposure control amount calculating section 34 determines that flash light emission is not to be performed, the exposure control amount calculating section 34 goes to step ST44.

In step ST42, the exposure control amount calculating section determines whether the subject region exposure control amount CVm is larger than the background region exposure control amount CVb. In the case where the subject region exposure control amount CVm is larger than the background region exposure control amount CVb, the exposure control amount calculating section 34 goes to step ST43. In the case where the subject region exposure control amount CVm is not larger than the background region exposure control amount CVb, the exposure control amount calculating section 34 goes to step ST44.

In step ST43, the exposure control amount calculating section sets the contribution ratios emphasizing the background region. The exposure control amount calculating section 34 sets the temporary contribution ratios "Rmtmp: Rbtmp (>Rmtmp)" emphasizing the background region, and goes to step ST45.

In step ST44, the exposure control amount calculating section sets the contribution ratios emphasizing the subject region. The exposure control amount calculating section 34 sets the temporary contribution ratios "Rmtmp: Rbtmp (<Rmtmp)" emphasizing the subject region, and goes to step ST45.

In step ST45, the exposure control amount calculating section calculates the exposure control amount CVtmp corresponding to the temporary contribution ratios. The exposure control amount calculating section 34 calculates the exposure control amount CVtmp by mixing the subject region exposure control amount CVm with the background region exposure control amount CVb at the mixing ratio of the temporary contribution ratios "Rmtmp:Rbtmp" set in step ST43 or in step ST44. The exposure control amount calculating section 34 then goes to step ST46.

In step ST46, the exposure control amount calculating section calculates the exposure control amount difference CVdif. The exposure control amount calculating section 34 calculates the exposure control amount difference CVdif between the exposure control amount CVtmp calculated in step ST45 on one hand, and the region exposure control amount with the lower contribution ratio on the other hand. The exposure control amount calculating section 34 then goes to step ST47.

In step ST47, the exposure control amount calculating section compares the exposure control amount difference CVdif with the threshold value CVth. The exposure control amount calculating section 34 compares the exposure control amount difference CVdif calculated in step ST46 with the predetermined threshold value CVth. In the case where the exposure control amount difference CVdif is larger than the threshold value CVth, the exposure control amount calculating section 34 goes to step ST48. In the case where the exposure control amount difference CVdif is not larger than the threshold value CVth, the exposure control amount calculating section 34 goes to step ST49.

In step ST48, the exposure control amount calculating section adjusts the contribution ratios. The exposure control amount calculating section 34 adjusts the temporary contribution ratios in such a manner that the exposure control amount difference CVdif falls within the threshold value CVth, e.g., that the exposure control amount difference CVdif becomes equal to the threshold value CVth. The exposure control amount calculating section 34 then goes to step ST49.

In step ST49, the exposure control amount calculating section adjusts the contribution ratios on the basis of the imaging-related information. In accordance with the imaging-related information, the exposure control amount calculating section 34 adjusts the temporary contribution ratios set in step ST43 or in step ST44 or the temporary contribution ratios adjusted in step ST48 in such a manner that the exposure control amount difference CVdif does not exceed the threshold value CVth. The exposure control amount calculating section 34 sets the adjusted contribution ratios as the final contribution ratios.

In the case where the imaging-related information indicates the imaging environment information such as an external light illuminance (e.g., LV (Light Value) value) and where the illuminance is significantly high, the exposure control amount calculating section 34 adjusts the contribution ratios in such a manner as not to render the background too dark.

In the case where the imaging-related information includes the imaging environment information such as the distance to the subject and the imaging setting information such as flash reaching distance and where the flash light is determined not to reach the subject, the exposure control amount calculating section 34 makes adjustments to increase the contribution ratio of the subject region.

In the case where the imaging-related information includes the image state information such as the area ratio of the subject region in a picked up image, the exposure control amount calculating section 34 makes adjustments to make the contribution ratio of the subject region higher the larger the area ratio becomes. In the case where, for example, the information based on the picked up image is the position of the subject region in the picked up image and where the subject of interest is near the center of the image, the exposure control amount calculating section 34 makes adjustments to increase the contribution ratio of the subject region. Further, the exposure control amount calculating section 34 adjusts the contribution ratios in accordance with the amount of image blur of the background region provided as information based on the picked up image, thereby making the contribution ratio of the subject region higher the larger the amount of image blur of the background becomes.

In the case where the user setting information in the imaging-related information indicates an imaging mode selected by the user from among multiple imaging modes such as an imaging mode suitable for imaging persons, an imaging mode suitable for imaging landscapes, and an imaging mode suitable for imaging night scenes, the exposure control amount calculating section 34 adjusts the contribution ratios in accordance with the selected imaging mode.

Further, the exposure control amount calculating section 34 may adjust the contribution ratios by giving preference to the user setting information over the other information in the imaging-related information. For example, in the case where either the subject region or the background region is designated as the region to be emphasized by the user's settings, the exposure control amount calculating section 34 makes the contribution ratio of the region exposure control amount of the designated region higher than the contribution ratio of the region exposure control amount of the undesignated region regardless of the other information in the imaging-related information. The region to be emphasized may be designated by the user selecting the region of interest from a menu, for example. Alternatively, the user may designate the region to be emphasized in the picked up image.

The adjustment of the contribution ratios based on the imaging-related information is not limited to the sequence of the steps depicted in FIG. 14. For example, the exposure control amount calculating section 34 may perform the process of step ST49 immediately before step ST45 to calculate the exposure control amount CVtmp using the temporary contribution ratios adjusted on the basis of the imaging-related information. In the case where, for example, the contribution ratios are set with emphasis on the background region in step ST43 or where the contribution ratios are set with emphasis on the subject region in step ST44, the exposure control amount calculating section 34 may adjust the predetermined contribution ratios on the basis of the imaging-related information and use the adjusted contribution ratios as the temporary contribution ratios "Rmtmp:Rbtmp (<Rmtmp)" or "Rmtmp:Rbtmp (>Rmtmp)" in order to set the final contribution ratios through the processing similar to what is depicted in FIG. 7 or in FIG. 11.

The above-described another operation example provides advantageous effects similar to those of the first and the second operation examples. Furthermore, this operation example permits detailed exposure control in keeping with the imaging situation. In the case where, for example, an imaging section is separately provided and connected with a camera control unit via wired or wireless transmission paths, the above-described exposure control may be carried out by the camera control unit 3. Application Examples 3-1. First Application Example The technology of the present disclosure may be applied to diverse products. For example, the technology of the present disclosure may be implemented as an apparatus to be mounted on such mobile objects as automobiles, electric vehicles, hybrid electric vehicles, motorcycles, bicycles, personal mobility devices, aircraft, drones, ships, robots, construction equipment, and agricultural machinery (tractors).

Figure 15:
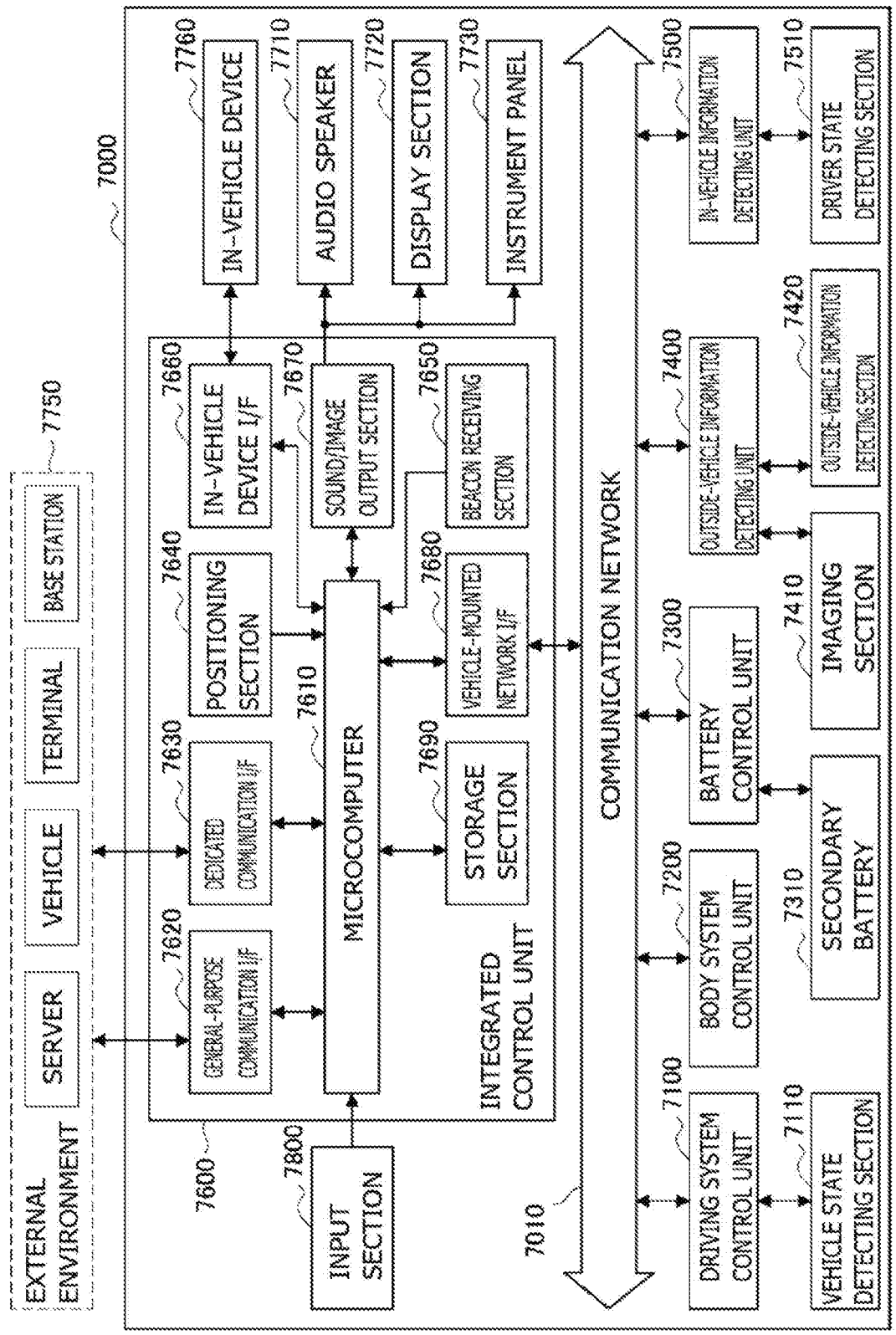
FIG. 15 is a block diagram depicting an example of schematic configuration of a vehicle control system.

FIG. 15 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 15, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 15 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 16:
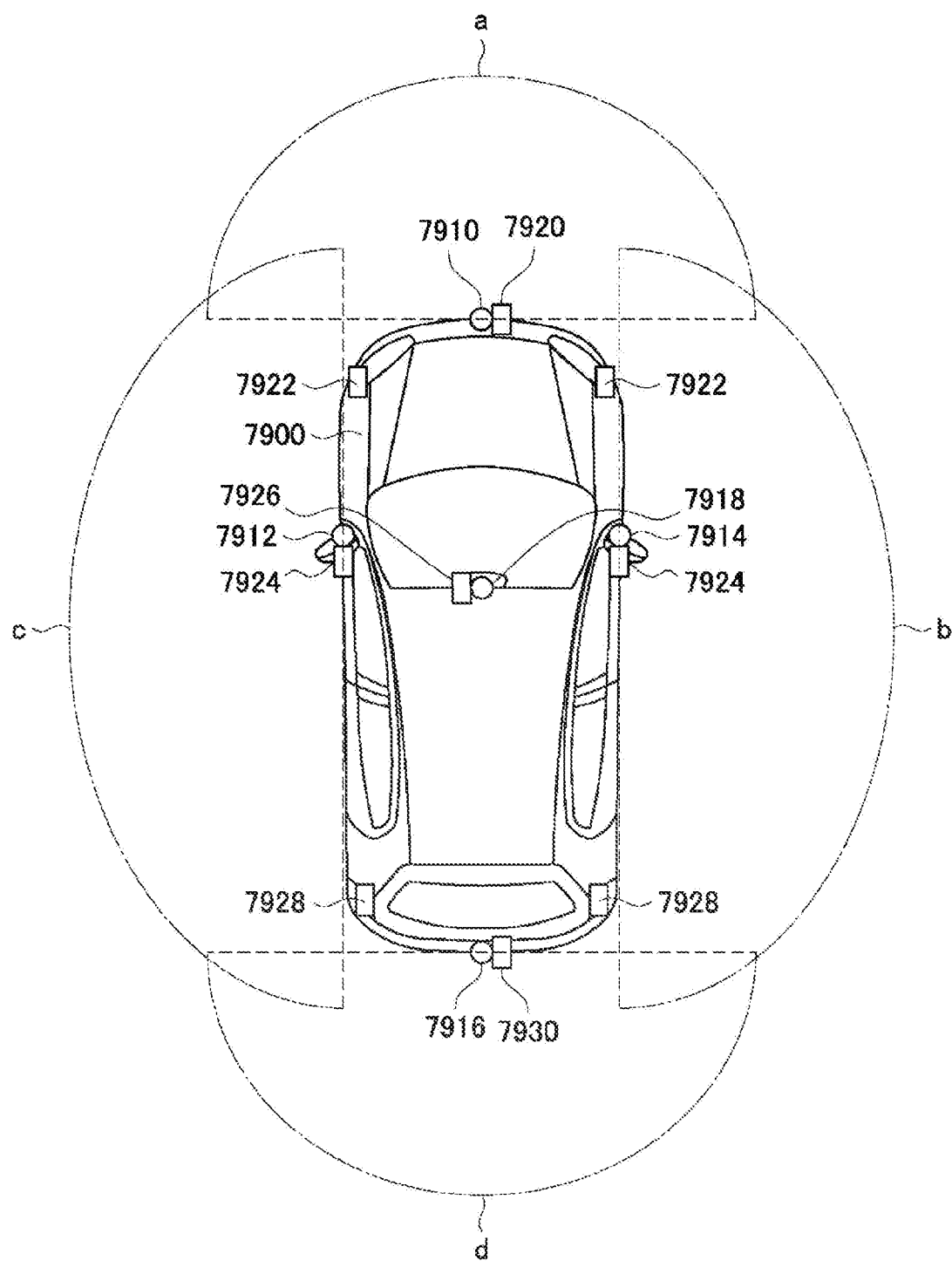
FIG. 16 is a diagram of assistance in explaining an example of installation positions of an outside-vehicle information detecting section and an imaging section.

FIG. 16 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 16 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 15, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination.

The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 15, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 15 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

The technology of the present disclosure may be applied advantageously to the outside-vehicle information detecting unit 7400 or to the in-vehicle information detecting unit 7500 among the above-descried components. For example, a person, a vehicle, an obstacle, a traffic sign, or characters on the road surface in the picked up image may be set as the subject region or as the background region for use in setting the exposure control amounts. This permits acquisition of the picked up image suitable for use by the driver or for image recognition processing. That in turn improves the usability of the vehicle control system 7000.

3-2. Second Application Example

A case of applying the technology of the present disclosure to an endoscopic surgery system is explained below as a second application example.

Figure 17:
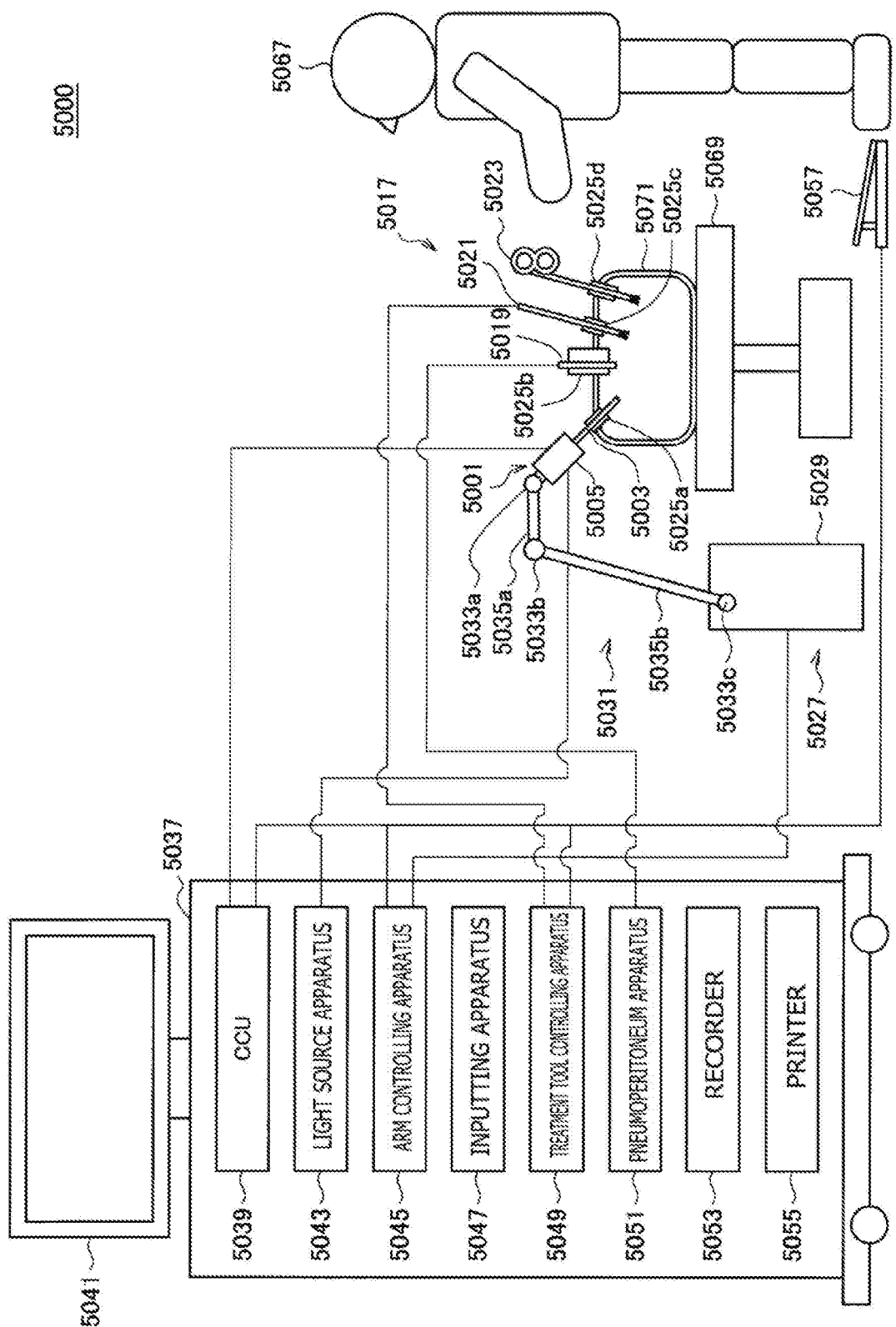
FIG. 17 is a view depicting an example of a schematic configuration of an endoscopic surgery system.

FIG. 17 is a view depicting an example of a schematic configuration of an endoscopic surgery system 5000 to which the technology according to an embodiment of the present disclosure can be applied. In FIG. 17, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840×vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 17, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033$a$ to 5033$c$ such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033$a$ to 5033$c$ of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 18:
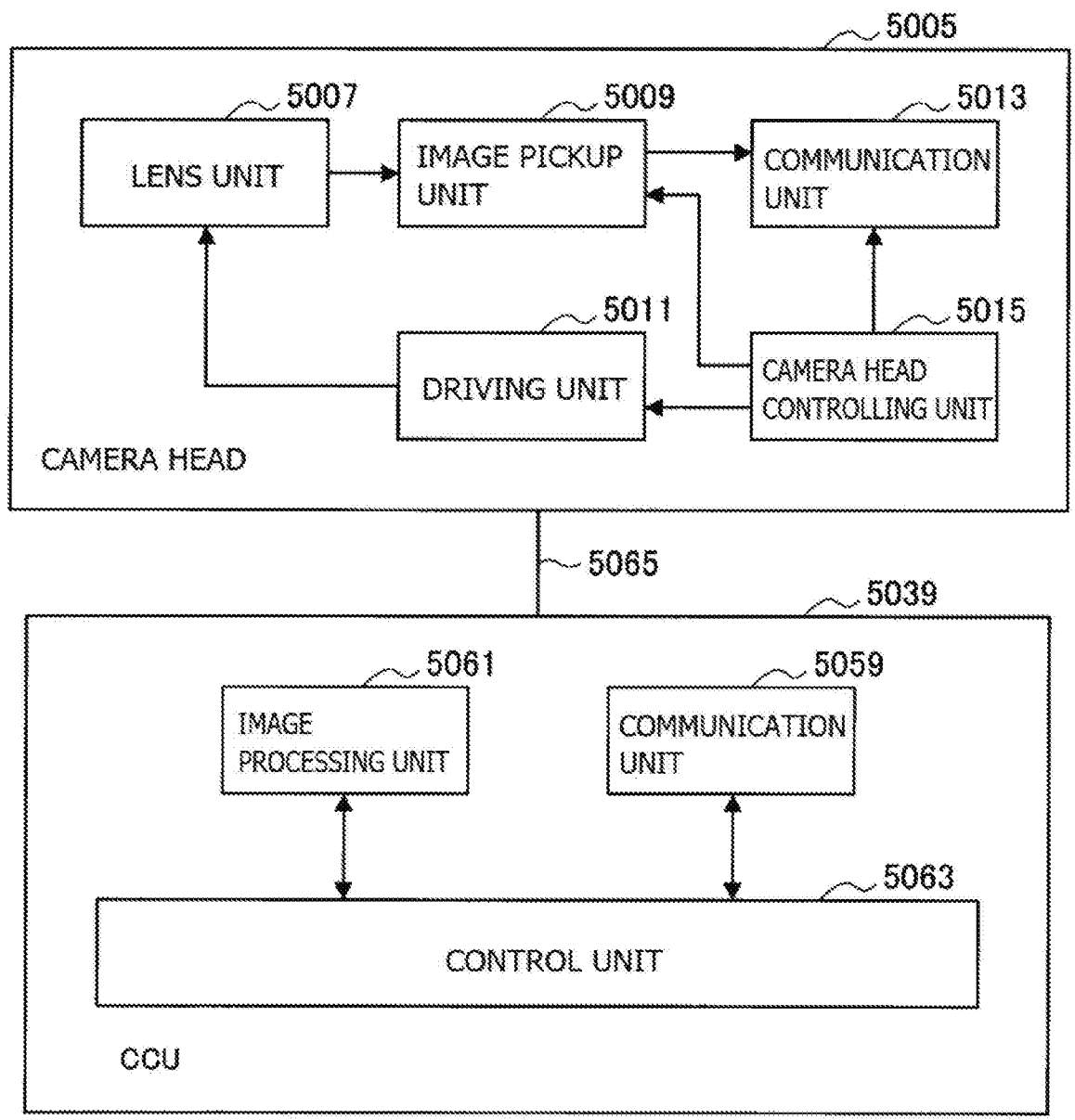
FIG. 18 is a block diagram depicting an example of a functional configuration of a camera head and a camera control unit (CCU) depicted in FIG. 17.

Functions of the camera head 5005 of the endoscope 5001 and the CCU 5039 are described in more detail with reference to FIG. 18. FIG. 18 is a block diagram depicting an example of a functional configuration of the camera head 5005 and the CCU 5039 depicted in FIG. 17.

Referring to FIG. 18, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology of the present disclosure may be applied advantageously to the image processing unit 5061 among the above-described components. For example, the region of the surgical tools 5017 in the picked up image may be set as the subject region or as the background region for use in setting the exposure control amounts. This enables the surgeon 5067 or assistants to easily observe a body tissue of the patient 5071, for example. Further, in images such as those of funduscopic examinations with a distinct black-and-white contrast in imaging the body tissue, the surgical tools 5017 or the body tissue desired to be observed may be set as the subject region or as the background region for use in setting the exposure control amounts. This provides easy observation for the surgeon 5067 or for assistants. That in turn improves the usability of the endoscopic surgery system 5000.

The series of the processes described above may be executed by hardware, by software, or by a combination of both. In the case where the software-based processing is to be carried out, the programs recording the process sequences involved are installed into an internal memory of a computer in dedicated hardware for program execution. Alternatively, the programs may be installed into a general-purpose computer capable of performing diverse processes for execution of the programs.

For example, the programs may be recorded beforehand on a hard disk, an SSD (Solid State Drive), or a ROM (Read Only Memory) serving as recording media. Alternatively, the programs may be stored (recorded) temporarily or permanently on removable recording media such as a flexible disc, a CD-ROM (Compact Disc Read Only Memory), an OM (Magneto optical) disc, a DVD (Digital Versatile Disc), a BD (Blu-Ray Disc (registered trademark)), a magnetic disk, or a semiconductor memory card. Such removable recording media may be offered as so-called packaged software.

Besides being installed into the computer from the removable recording media, the programs may also be transferred in a wired or wireless manner from a download site to the computer via networks such as a LAN (Local Area Network) or the Internet. The computer may receive the programs thus transferred and install them onto internal recording media such as a hard disk.

The advantageous effects stated in this description are only examples and are not limitative of the present technology. There may be additional advantageous effects derived from and not covered by this description. The present technology should not be limited to the embodiments of the technology discussed above when interpreted. The embodiments of the technology are presented only as illustrations in disclosing the present technology. It is evident that many alternatives, modifications, and variations of the embodiments will become apparent to those skilled in the art without departing from the spirit and scope of this technology. Accordingly, the scope of the present technology should be determined in consideration of the appended claims and their legal equivalents, rather than by the examples given.

The present disclosure may be implemented preferably in the following configurations:

(1) A control apparatus including:

an exposure control amount calculating section configured to calculate an exposure control amount for use in exposure adjustment based on a subject region exposure control amount calculated on the basis of photometric values of a subject region and on a background region exposure control amount calculated on the basis of photometric values of a background region.

(2) The control apparatus as stated in paragraph (1) above, in which the exposure control amount calculating section calculates the exposure control amount based on a result of comparison between the subject region exposure control amount and the background region exposure control amount.

(3) The control apparatus as stated in paragraph (2) above, in which the exposure control amount calculating section sets a contribution ratio of the subject region exposure control amount and a contribution ratio of the background region exposure control amount, the exposure control amount calculating section further calculating the exposure control amount based on the contribution ratios.

(4) The control apparatus as stated in paragraph (3) above, in which the exposure control amount calculating section sets the contribution ratios based on the result of comparison between the subject region exposure control amount and the background region exposure control amount.

(5) The control apparatus as stated in paragraph (4) above in which, in a case where the subject region exposure control amount is larger than the background region exposure control amount, the exposure control amount calculating section makes the contribution ratio of the background region exposure control amount higher than that of the subject region exposure control amount.

(6) The control apparatus as stated in paragraph (4) or (5) above in which, in a case where flash light emission is not to be performed, or in a case where the subject region exposure control amount is not larger than the background region exposure control amount, the exposure control amount calculating section makes the contribution ratio of the subject region exposure control amount higher than that of the background region exposure control amount.

(7) The control apparatus as stated in any one of paragraphs (3) to (6) above, in which the exposure control amount calculating section adjusts the contribution ratios in such a manner that a difference between the exposure control amount calculated on the basis of the set contribution ratios and the exposure control amount of the region with the lower contribution ratio does not exceed a predetermined threshold value.

(8) The control apparatus as stated in paragraph (7) above, in which the exposure control amount calculating section adjusts the contribution ratios in a case where the subject region exposure control amount is larger than the background region exposure control amount.

(9) The control apparatus as stated in any one of paragraphs (3) to (8) above, in which the exposure control amount calculating section adjusts the contribution ratios based on imaging-related information regarding acquisition of a picked up image.

(10) The control apparatus as stated in paragraph (9) above, in which the imaging-related information includes any one of imaging environment information, imaging setting information, image state information regarding the picked up image, or user setting information.

(11) The control apparatus as stated in paragraph (10) above, in which the imaging environment information includes an external light illuminance or a distance to a subject.

(12) The control apparatus as stated in paragraph (10) or (11) above, in which the imaging setting information includes any one of a shutter speed, an ISO speed, an aperture value, a flash light emission amount, or a flash reaching distance.

(13) The control apparatus as stated in any one of paragraphs (10) to (12) above, in which the image state information includes any one of an area ratio between the subject region and the background region, a position of the subject region in the picked up image, or an amount of image blur of the background region.

(14) The control apparatus as stated in any one of paragraphs (10) to (13) above, in which the exposure control amount calculating section adjusts the contribution ratios by giving preference to the user setting information over other information in the imaging-related information.

(15) The control apparatus as stated in any one of paragraphs (1) to (14) above, further including:

a region extracting section configured to extract an image of the subject region and an image of the background region from the picked up image; and a region-specific exposure control amount calculating section configured to calculate the subject region exposure control amount based on the image of the subject region and the background region exposure control amount based on the image of the background region.

(16) The control apparatus as stated in paragraph (15) above in which, in a case where the image of either the subject region or the background region cannot be extracted, the region extracting section obtains as the image of the non-extracted region the picked up image minus the image of the extracted region.

(17) The control apparatus as stated in paragraph (15) above in which, in a case where the region extracting section cannot extract the image of the subject region and the image of the background region, the region-specific exposure control amount calculating section calculates a whole region exposure control amount based on the picked up image, and the exposure control amount calculating section obtains as the exposure control amount the whole region exposure control amount calculated by the region-specific exposure control amount calculating section.

INDUSTRIAL APPLICABILITY

According to the control apparatus, control method, and program of the present technology, the exposure control amounts are calculated on the basis of the subject region exposure control amount calculated from the image of the subject region in the picked up image and the background region exposure control amount calculated from the image of the background region in the picked up image. When the exposure is adjusted in accordance with the exposure control amounts thus calculated, stable exposure is obtained. Thus, the present technology may be applied advantageously to systems such as the vehicle control system and the endoscopic surgery system requiring picked up images with natural, balanced brightness.

REFERENCE SIGNS LIST

10 Imaging apparatus
21 Imaging optical system block
22 Image sensor section
23 Signal processing section
24 Development processing section
25 Image recording section
31 Region extracting section
32$b$ Background region photometric section
32$m$ Subject region photometric section
32$w$ Whole region photometric section
33 Region-specific exposure control amount calculating section
33$b$ Background region exposure control amount calculating section
33$m$ Subject region exposure control amount calculating section
33$w$ Whole region exposure control amount calculating section
34 Exposure control amount calculating section
41 Light emission control amount calculating section
51 User interface section
55 Control section 55a Exposure control section
55b Light emission control section
61 Flash unit

The invention claimed is:

1. A control apparatus, comprising:
a central processing unit (CPU) configured to;
calculate a subject region exposure control amount based on photometric values of a subject region;
calculate a background region exposure control amount based on photometric values of a background region;
set a first contribution ratio of the subject region exposure control amount and a second contribution ratio of the background region exposure control amount based on a result of comparison between the subject region exposure control amount and the background region exposure control amount, wherein
the set second contribution ratio is higher than the set first contribution ratio, and
the result of the comparison indicates that the subject region exposure control amount is larger than the background region exposure control amount; and
calculate a first exposure control amount based on the set first contribution ratio of the subject region exposure control amount and the set second contribution ratio of the background region exposure control amount, wherein the first exposure control amount is associated with an exposure adjustment process.

2. The control apparatus according to claim 1,
based on flash light emission is not to be performed, or in a case the subject region exposure control amount is smaller than or equal to the background region exposure control amount, the CPU is further configured to set the first contribution ratio of the subject region exposure control amount higher than the second contribution ratio of the background region exposure control amount.

3. The control apparatus according to claim 1, wherein the CPU is further configured to:
adjust contribution ratios of the subject region exposure control amount and the background region exposure control amount; and
calculate second exposure control amount based on the contribution ratios, wherein a difference between the second exposure control amount and the subject region exposure control amount with a lower contribution ratio is below a specific threshold value.

4. The control apparatus according to claim 1, wherein the CPU is further configured to:
acquire a picked up image; and
adjust the first contribution ratio and the second contribution ratio based on imaging-related information associated with the picked up image.

5. The control apparatus according to claim 4, wherein the imaging-related information includes at least one of imaging environment information, imaging setting information, image state information of the picked up image, or user setting information.

6. The control apparatus according to claim 5, wherein the imaging environment information includes at least one of an external light illuminance or a distance to a subject.

7. The control apparatus according to claim 5, wherein the imaging setting information includes at least one of a shutter speed, an ISO speed, an aperture value, a flash light emission amount, or a flash reaching distance.

8. The control apparatus according to claim 5, wherein the image state information includes at least one of an area ratio between the subject region and the background region, a position of the subject region in the picked up image, or an amount of image blur of the background region.

9. The control apparatus according to claim 5, wherein the CPU is further configured to adjust the first contribution ratio and the second contribution ratio based on preference to the user setting information over other information in the imaging-related information.

10. The control apparatus according to claim 1, wherein the CPU is further configured to:
extract an image of the subject region and an image of the background region from a picked up image; calculate the subject region exposure control amount based on the image of the subject region; and
calculate the background region exposure control amount based on the image of the background region.

11. The control apparatus according to claim 10, wherein the CPU is further configured to acquire, based on a failure of extraction of one of the image of the subject region or the image of the background region, an image of a non-extracted region as a specific image, and
the specific image is a difference between the picked up image and the image of the extracted one of the subject region or the background region.

12. The control apparatus according to claim 10, wherein the CPU is further configured to:
calculate, based on a failure of extraction of the image of the subject region and the image of the background region, a whole region exposure control amount, wherein the whole amount region exposure control amount is calculated based on the picked up image; and
acquire the calculated whole region exposure control amount as the first exposure control amount.

13. A control method, comprising:
calculating a subject region exposure control amount based on photometric values of a subject region;
calculating a background region exposure control amount based on photometric values of a background region;
setting a first contribution ratio of the subject region exposure control amount and a second contribution ratio of the background region exposure control amount based on a result of comparison between the subject region exposure control amount and the background region exposure control amount, wherein
the set second contribution ratio is higher than the set first contribution ratio, and
the result of the comparison indicates that the subject region exposure control amount is larger than the background region exposure control amount; and
calculating an exposure control amount based on the set first contribution ratio of the subject region exposure control amount calculatcd the set second contribution ratio of the background region exposure control amount, wherein the exposure control amount is associated with an exposure adjustment process.

14. A non-transitory computer-readable medium having stored thereon computer-executable instructions that, when executed by a computer, cause the computer to execute operations, the operations comprising:
calculating a subject region exposure control amount based on photometric values of a subject region;
calculating a background region exposure control amount based on photometric values of a background region;
setting a first contribution ratio of the subject region exposure control amount and a second contribution ratio of the background region exposure control amount based on a result of comparison between the subject region exposure control amount and the background region exposure control amount, wherein
the set second contribution ratio is higher than the set first contribution ratio, and
the result of the comparison indicates that the subject region exposure control amount is larger than the background region exposure control amount; and
calculating an exposure control amount based on the set first contribution ratio of the subject region exposure control amount and the set second contribution ratio of the background region exposure control amount, wherein the exposure control amount is associated with an exposure adjustment process.

\* \* \* \* \*